Oct. 19, 1954    J. C. PLASTARAS    2,691,924
PHOTOCOMPOSING MACHINE
Filed Sept. 9, 1950    23 Sheets-Sheet 1
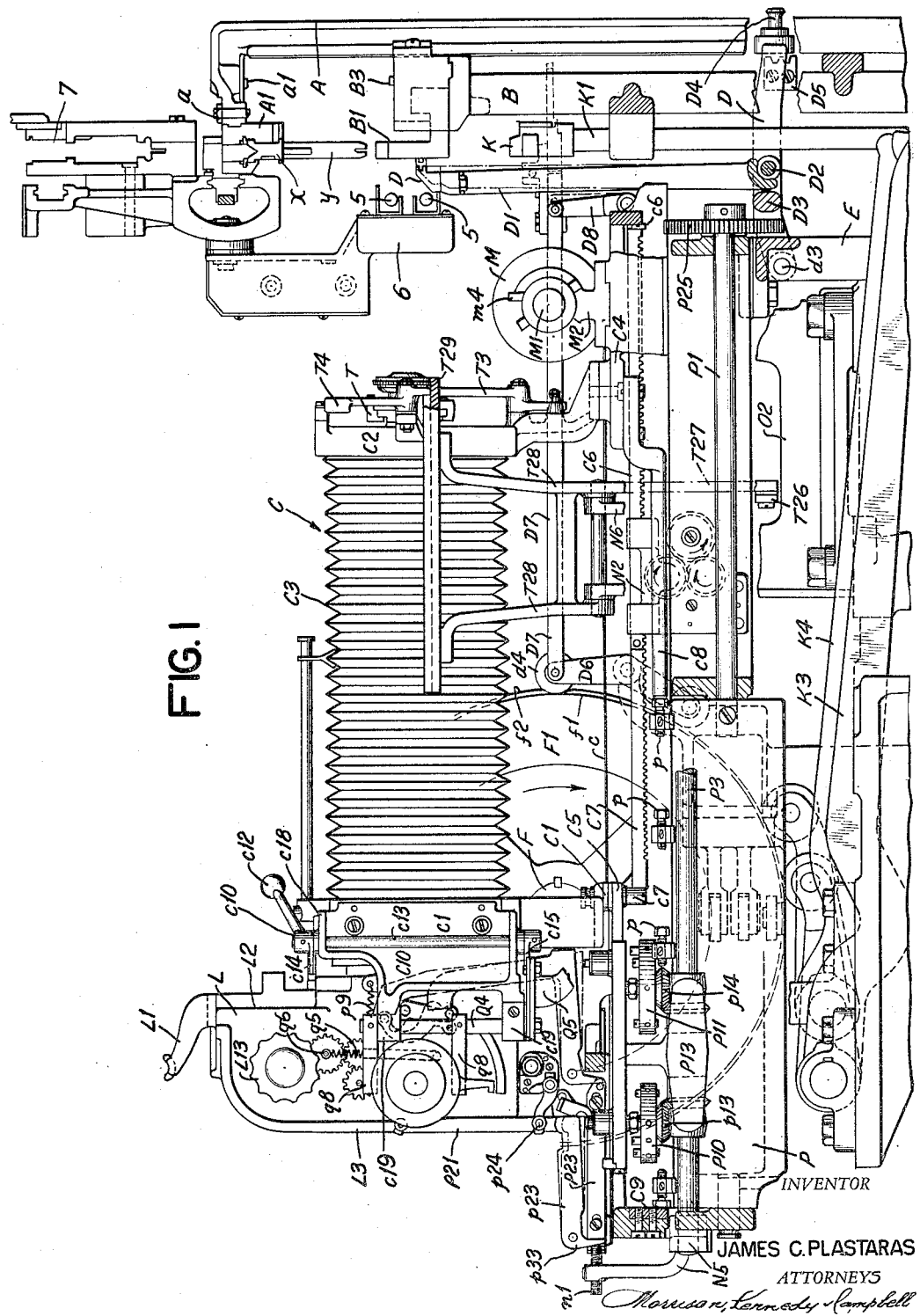
INVENTOR
JAMES C. PLASTARAS
ATTORNEYS Oct. 19, 1954     J. C. PLASTARAS     2,691,924
PHOTOCOMPOSING MACHINE
Filed Sept. 9, 1950     23 Sheets-Sheet 2
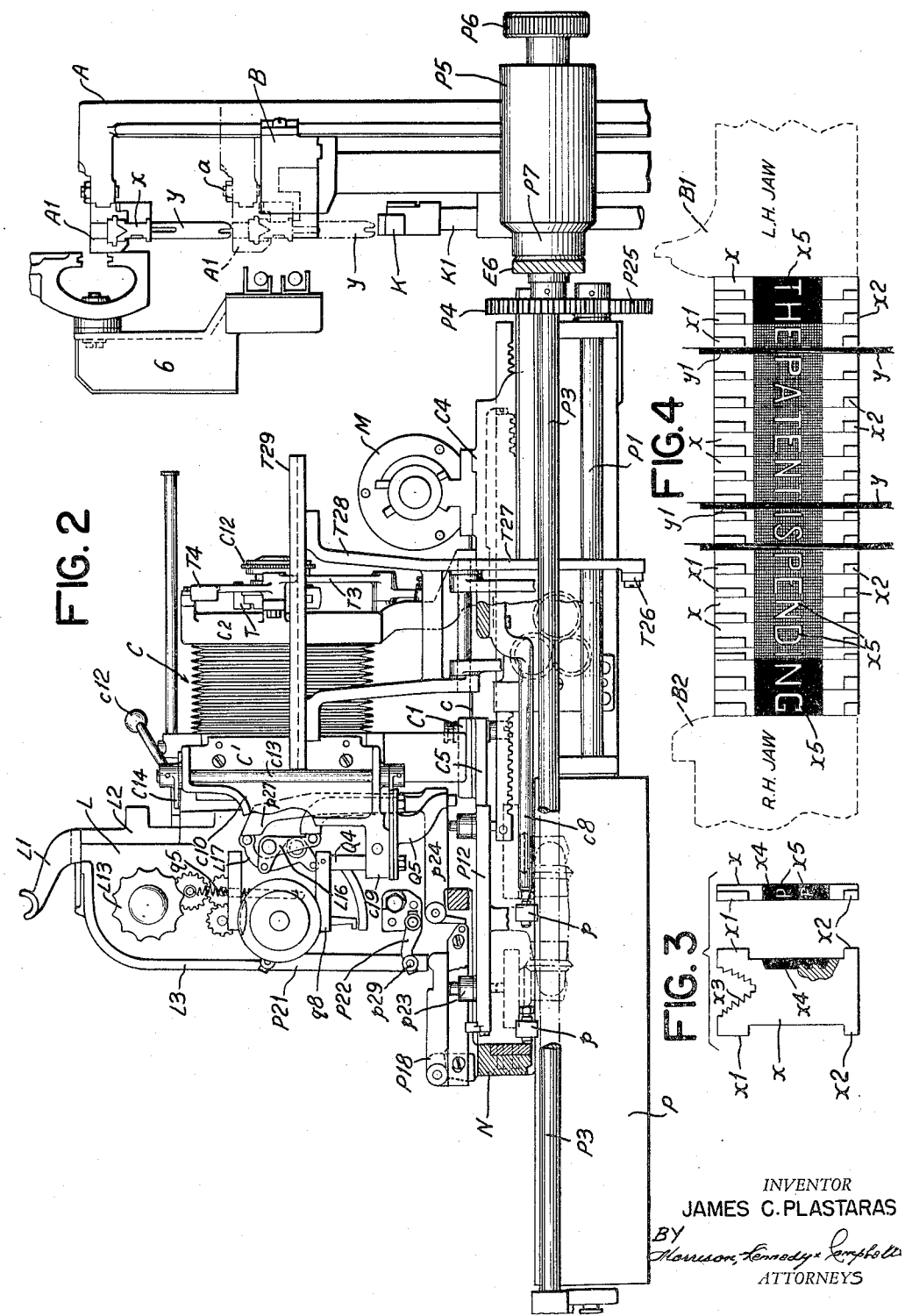
INVENTOR
JAMES C. PLASTARAS
BY
*Morrison, Kennedy & Campbell*
ATTORNEYS Oct. 19, 1954    J. C. PLASTARAS    2,691,924
PHOTOCOMPOSING MACHINE Filed Sept. 9, 1950    23 Sheets-Sheet 3

INVENTOR
JAMES C. PLASTARAS
BY
Morrison Kennedy Campbell
ATTORNEYS

Oct. 19, 1954        J. C. PLASTARAS        2,691,924

PHOTOCOMPOSING MACHINE

Filed Sept. 9, 1950        23 Sheets-Sheet 5

*INVENTOR*
JAMES C. PLASTARAS
BY
*Morrison, Kennedy & Campbell*
*ATTORNEYS*

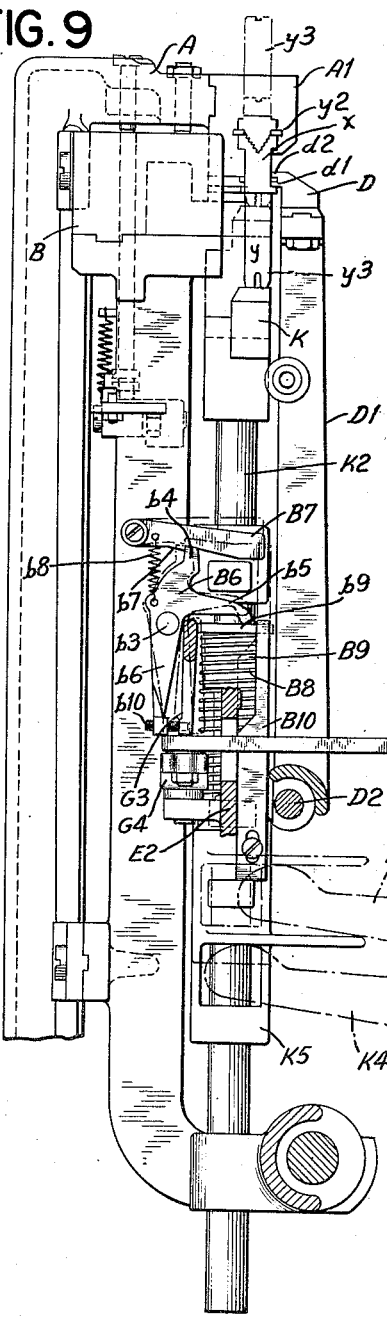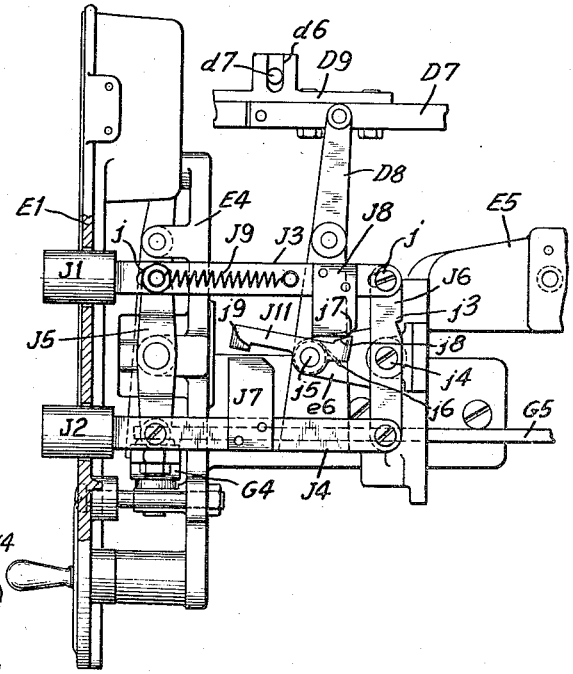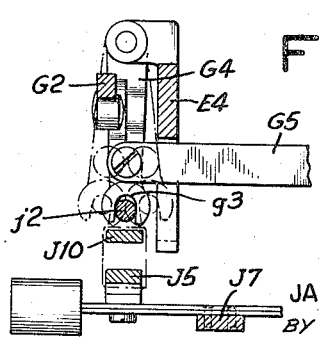

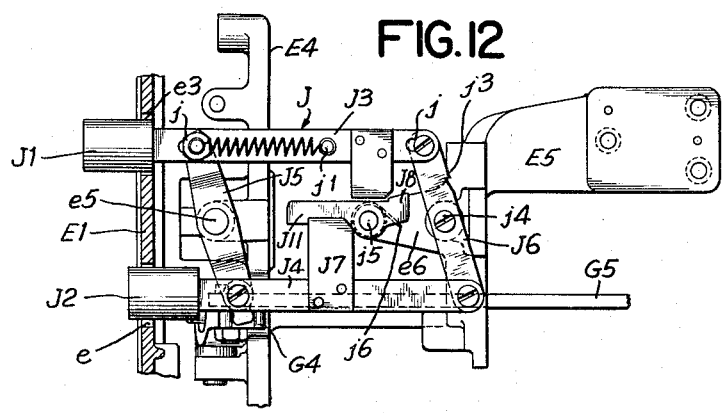
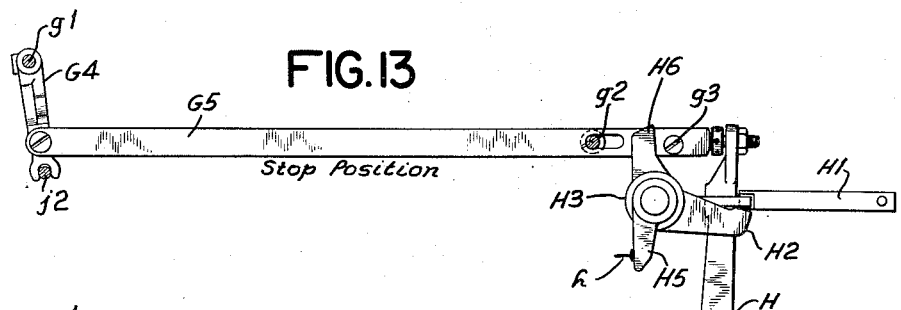
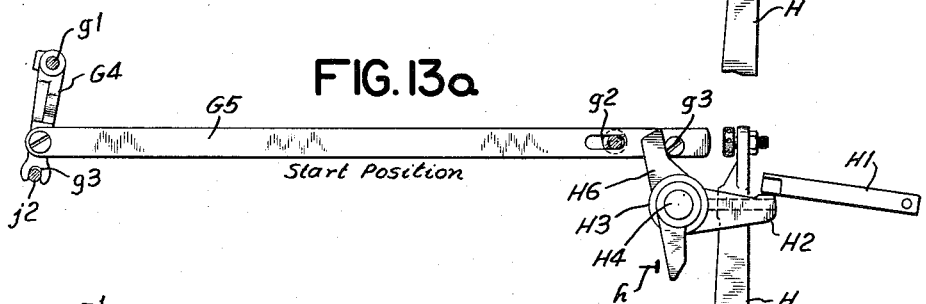
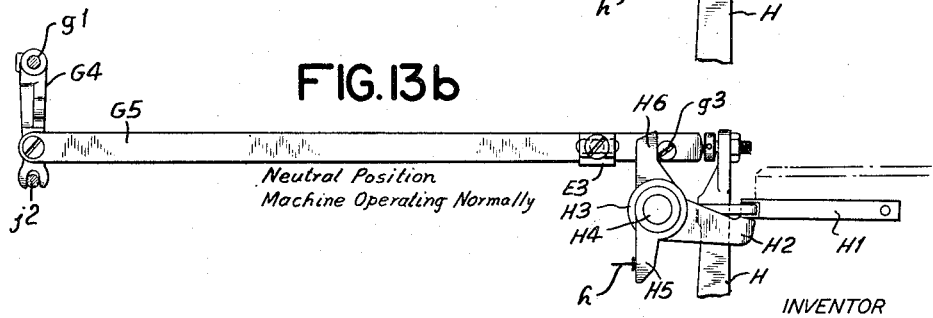

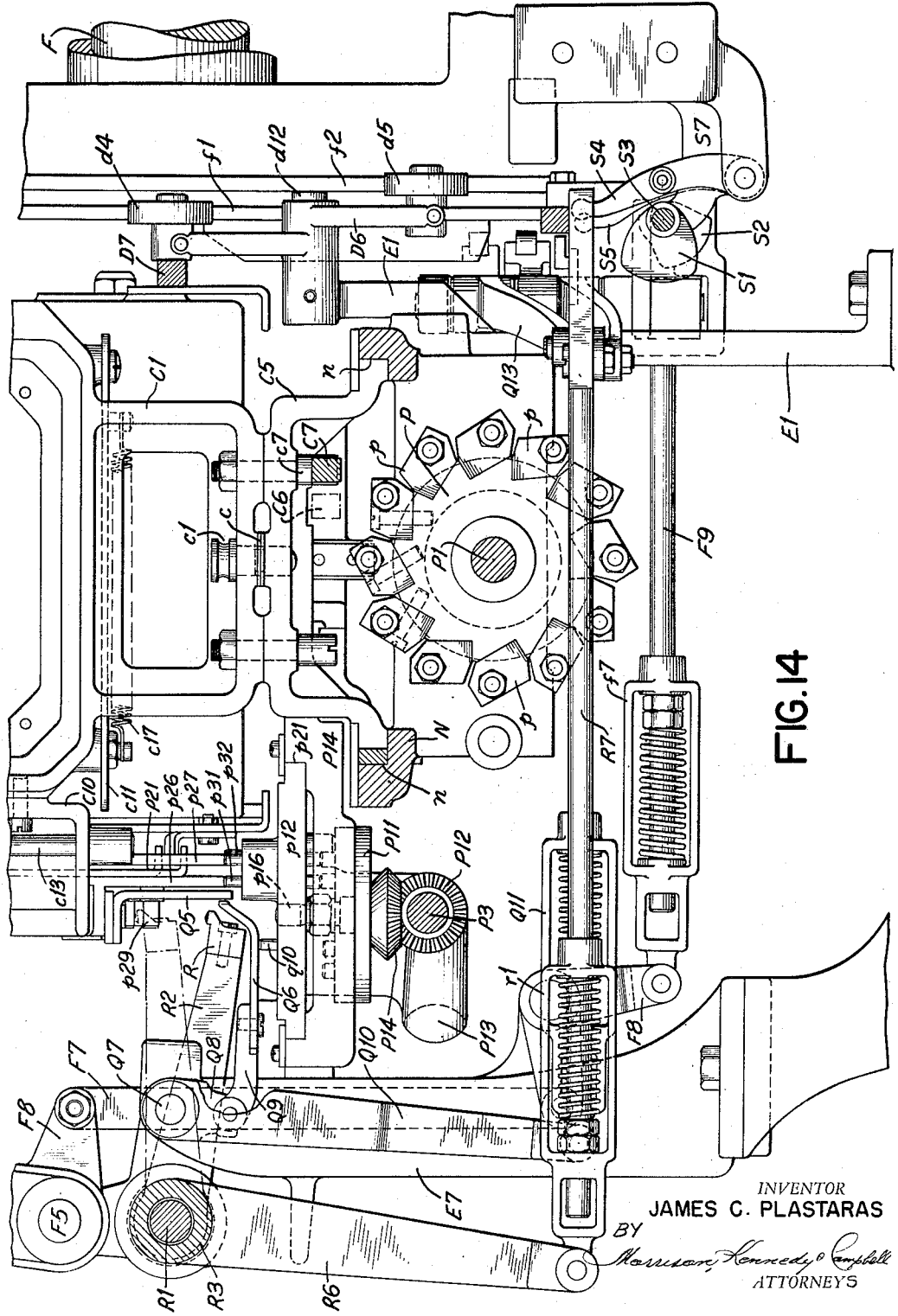

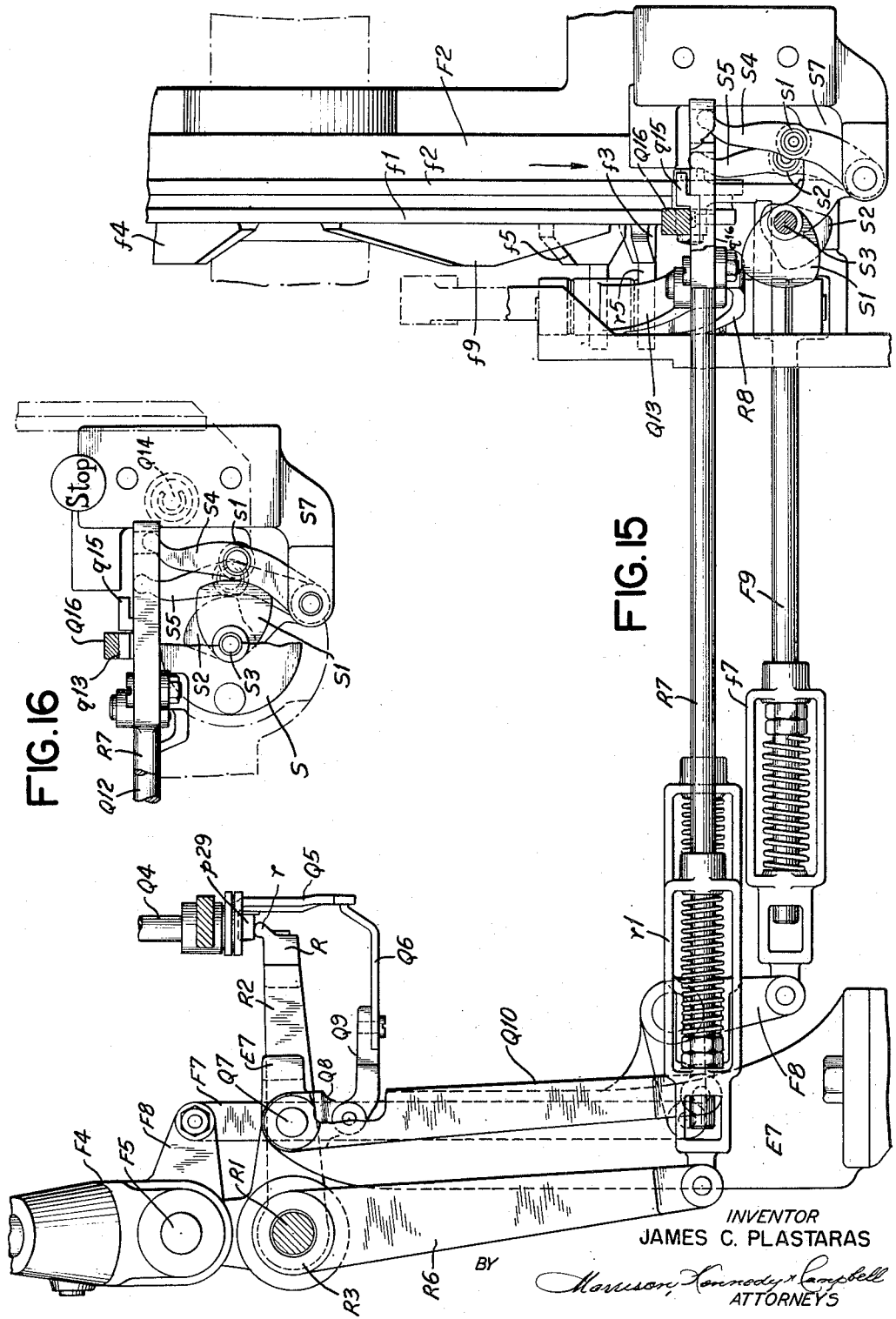

Oct. 19, 1954
J. C. PLASTARAS
2,691,924
PHOTOCOMPOSING MACHINE
Filed Sept. 9, 1950
23 Sheets-Sheet 10
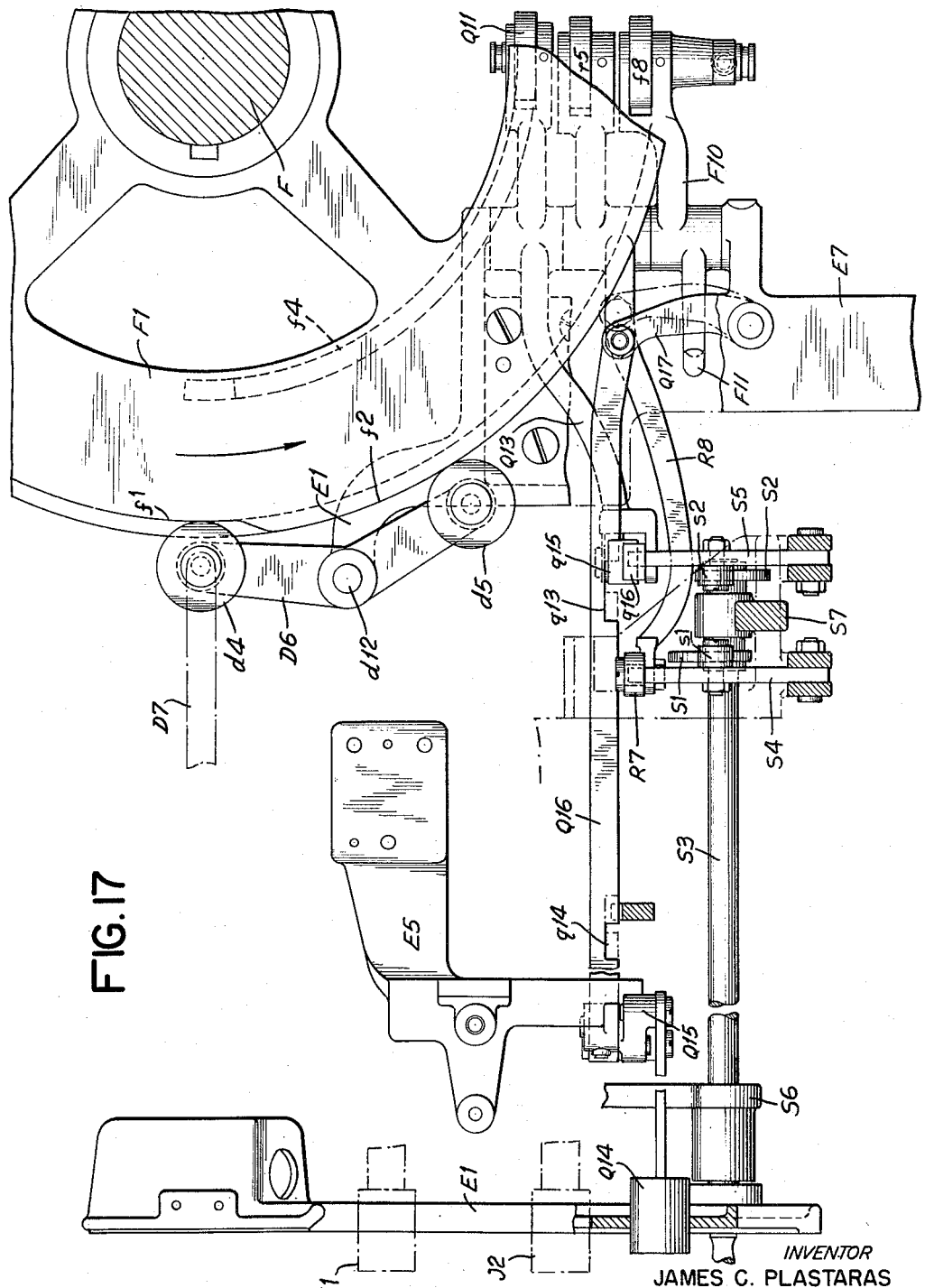
FIG. 17
INVENTOR
JAMES C. PLASTARAS
BY 
ATTORNEYS

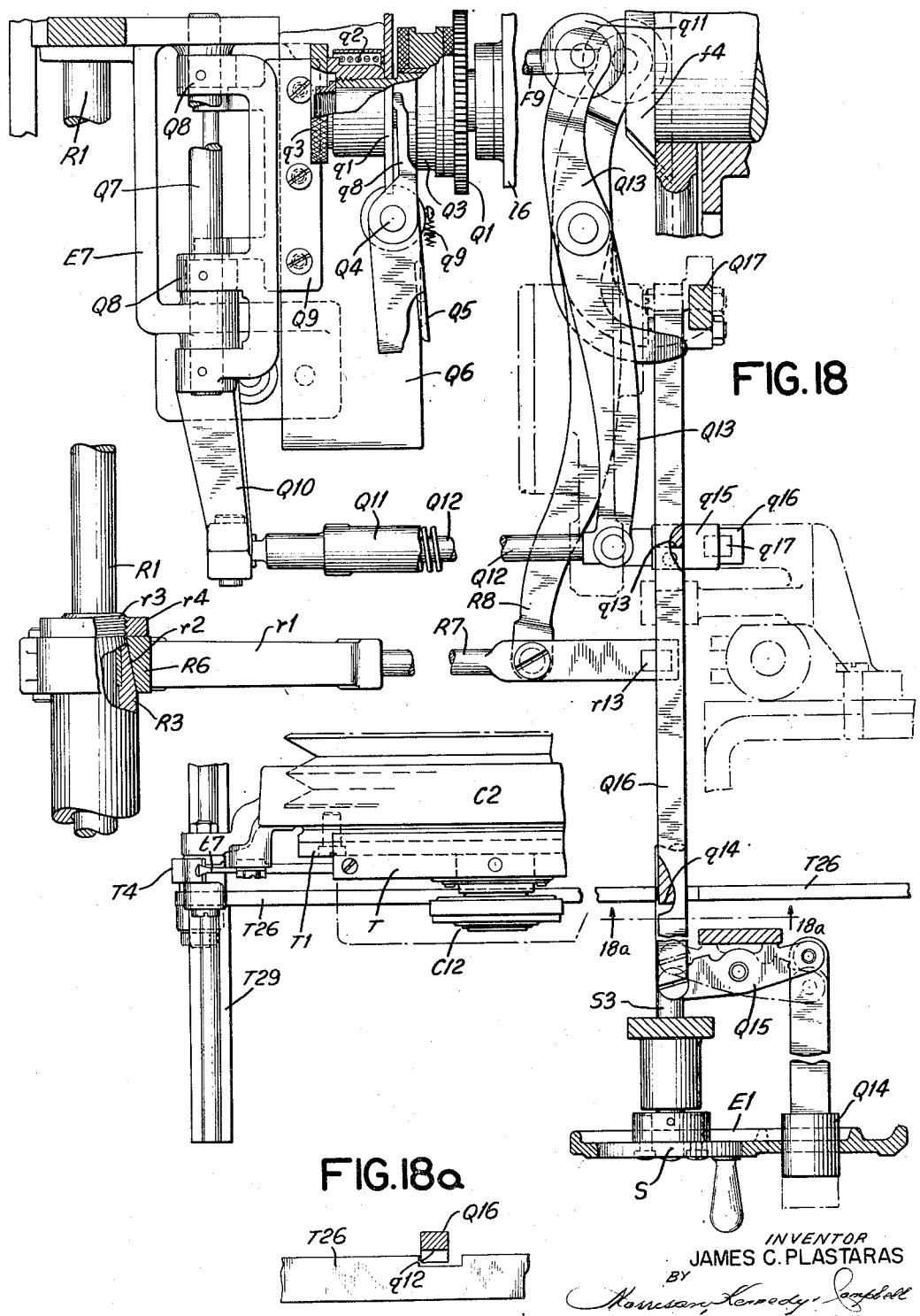

Oct. 19, 1954
J. C. PLASTARAS
2,691,924
PHOTOCOMPOSING MACHINE
Filed Sept. 9, 1950
23 Sheets-Sheet 12
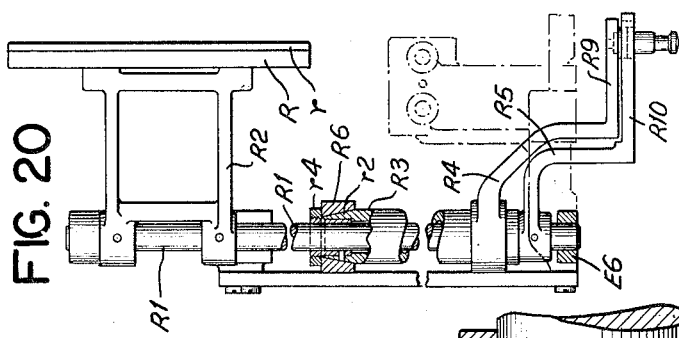
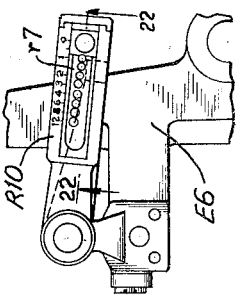
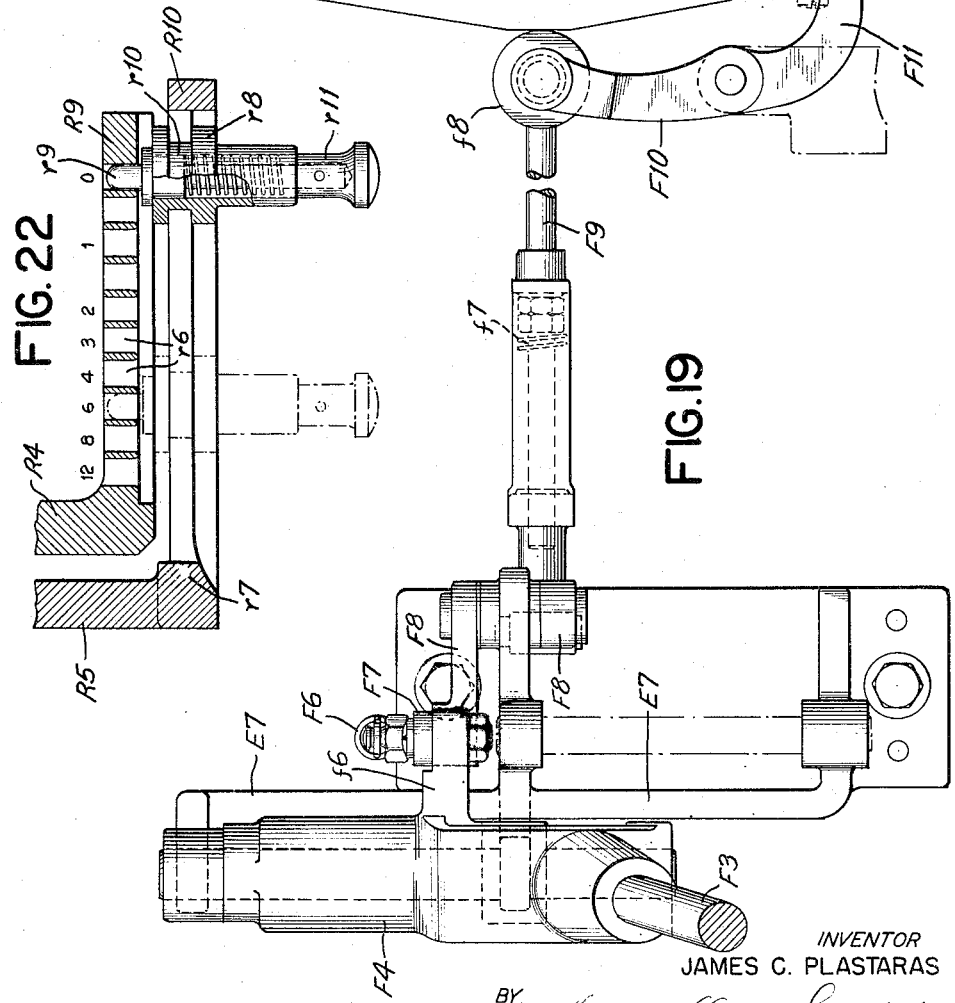
INVENTOR
JAMES C. PLASTARAS
BY Morrison, Kennedy & Campbell
ATTORNEYS

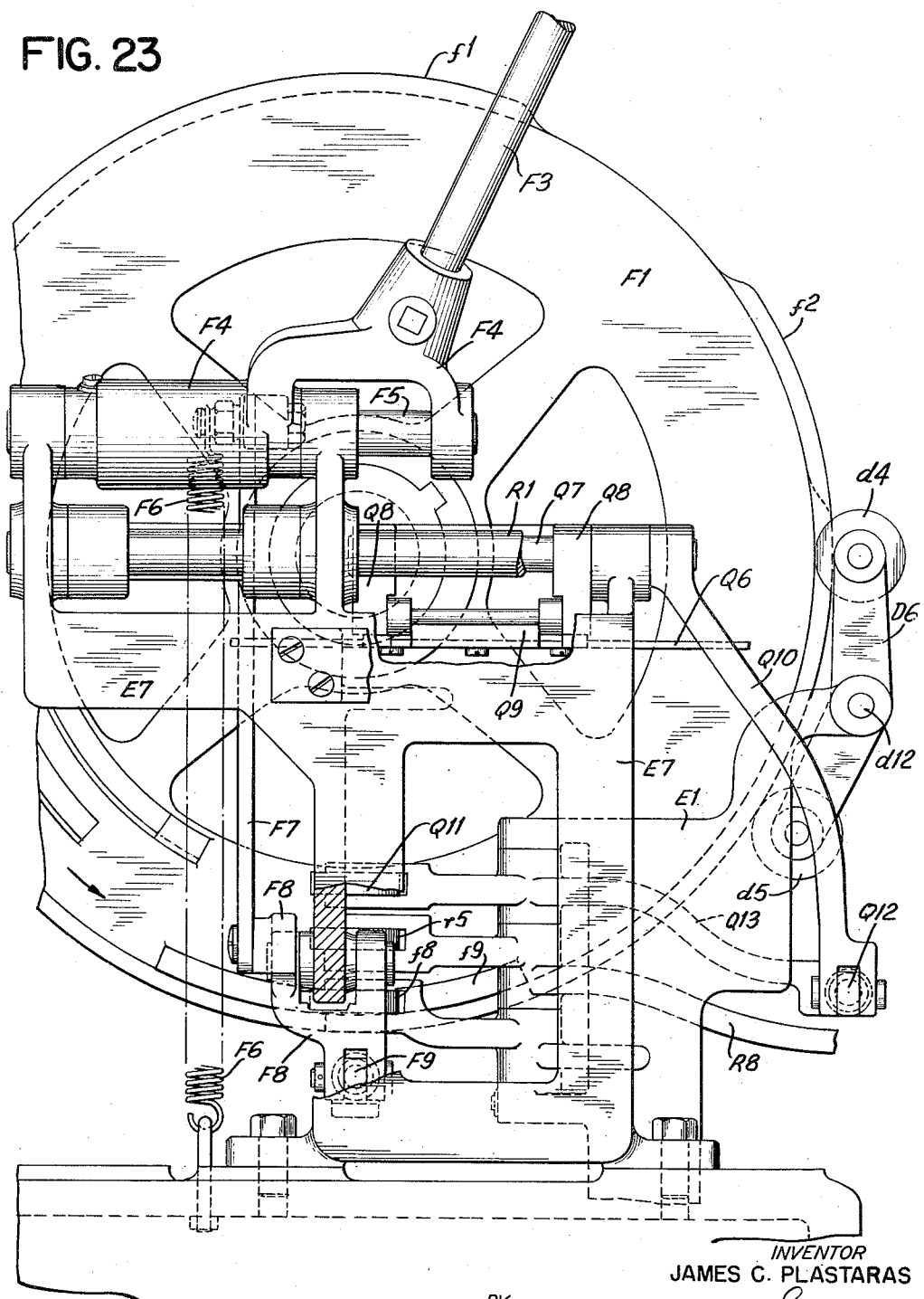

Oct. 19, 1954 J. C. PLASTARAS 2,691,924
PHOTOCOMPOSING MACHINE
Filed Sept. 9, 1950 23 Sheets-Sheet 14

INVENTOR
JAMES C. PLASTARAS
BY *Morrison, Kennedy & Campbell*
ATTORNEYS

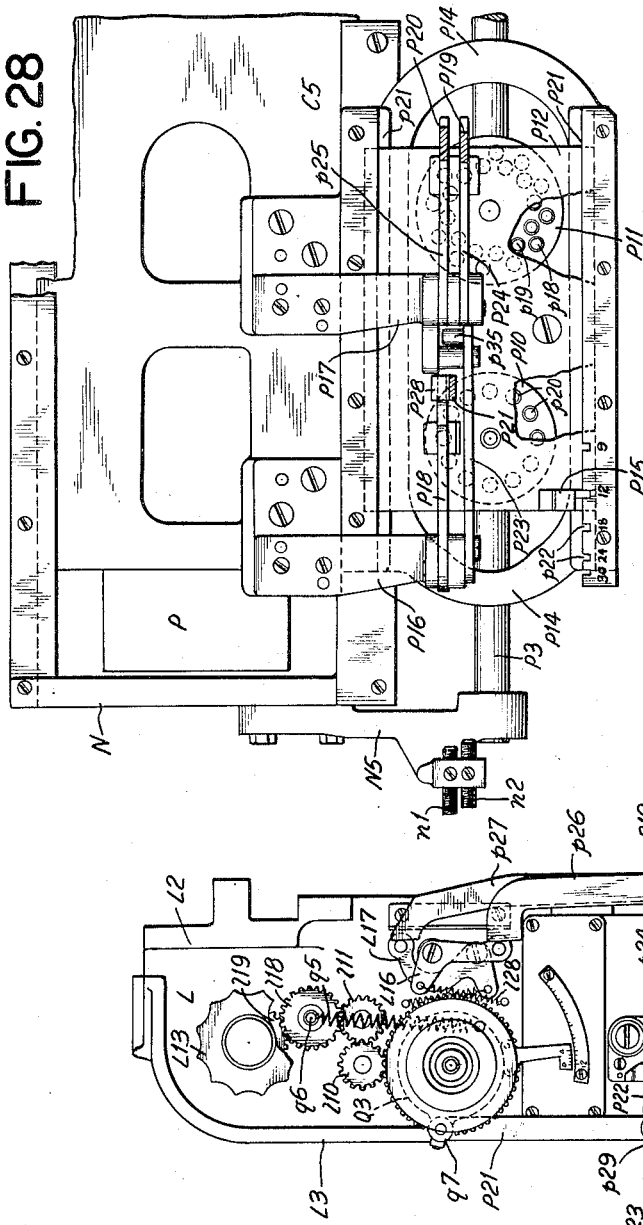
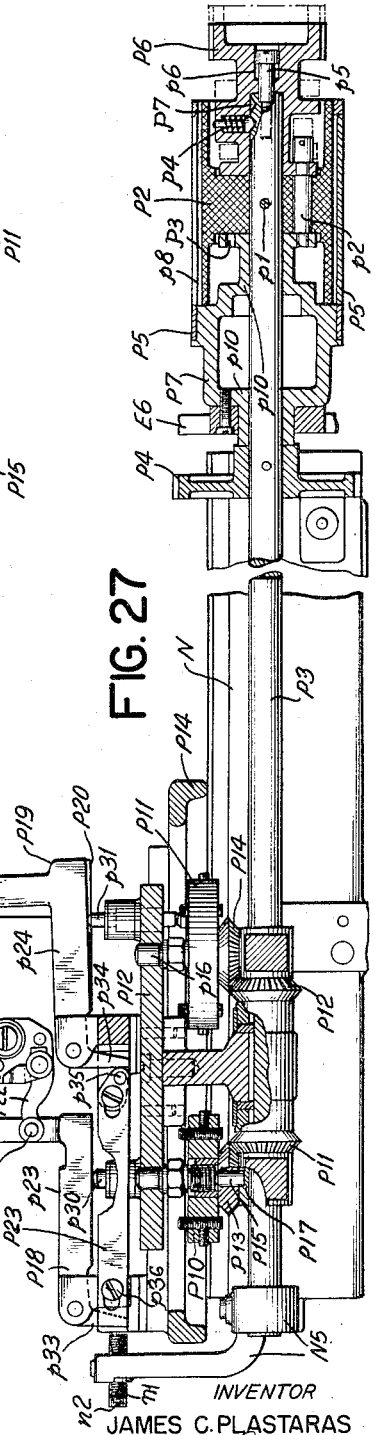

Oct. 19, 1954  J. C. PLASTARAS  2,691,924
PHOTOCOMPOSING MACHINE
Filed Sept. 9, 1950  23 Sheets-Sheet 16
FIG. 29
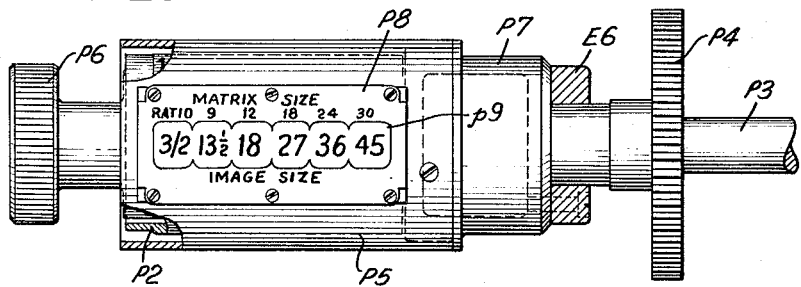
FIG. 30
Matrix Size
| Ratio | 9 pt. | 12 pt. | 18 pt. | 24 pt. | 30 pt. |
|---|---|---|---|---|---|
| 12 — 1/2 | 4½ | 6 | 9 | 12 | 15 |
| 11 — 2/3 | 6 | 8 | 12 | 16 | 20 |
| 10 — 3/4 | 6½ | 9 | 13½ | 18 | 22½ |
| 9 — 5/6 | 7½ | 10 | 15 | 20 | 25 |
| 8 — 1/1 | 9 | 12 | 18 | 24 | 30 |
| 7 — 7/6 | 10½ | 14 | 21 | 28 | 35 |
| 6 — 4/3 | 12 | 16 | 24 | 32 | 40 |
| 5 — 3/2 | 13½ | 18 | 27 | 36 | 45 |
| 4 — 7/4 | 16¼ | 21 | 32½ | 42 | 52½ |
| 3 — 2/1 | 18 | 24 | 36 | 48 | 60 |
| 2 — 5/2 | 22 | 30 | 45 | 60 | 75 |
| 1 — 3/1 | 27 | 36 | 54 | 72 | 90 |
FIG. 31
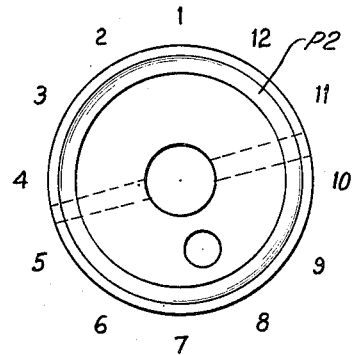
INVENTOR
JAMES C. PLASTARAS
BY *Morrison, Kennedy & Campbell*
ATTORNEYS Oct. 19, 1954    J. C. PLASTARAS    2,691,924
PHOTOCOMPOSING MACHINE Filed Sept. 9, 1950    23 Sheets—Sheet 17

INVENTOR
JAMES C. PLASTARAS
BY *Morrison, Kennedy & Campbell*
ATTORNEYS

Oct. 19, 1954

J. C. PLASTARAS 2,691,924

PHOTOCOMPOSING MACHINE

Filed Sept. 9, 1950

INVENTOR
JAMES C. PLASTARAS

BY Harrison, Kennedy & Campbell
ATTORNEYS

Oct. 19, 1954     J. C. PLASTARAS     2,691,924
PHOTOCOMPOSING MACHINE
Filed Sept. 9, 1950     23 Sheets-Sheet 19
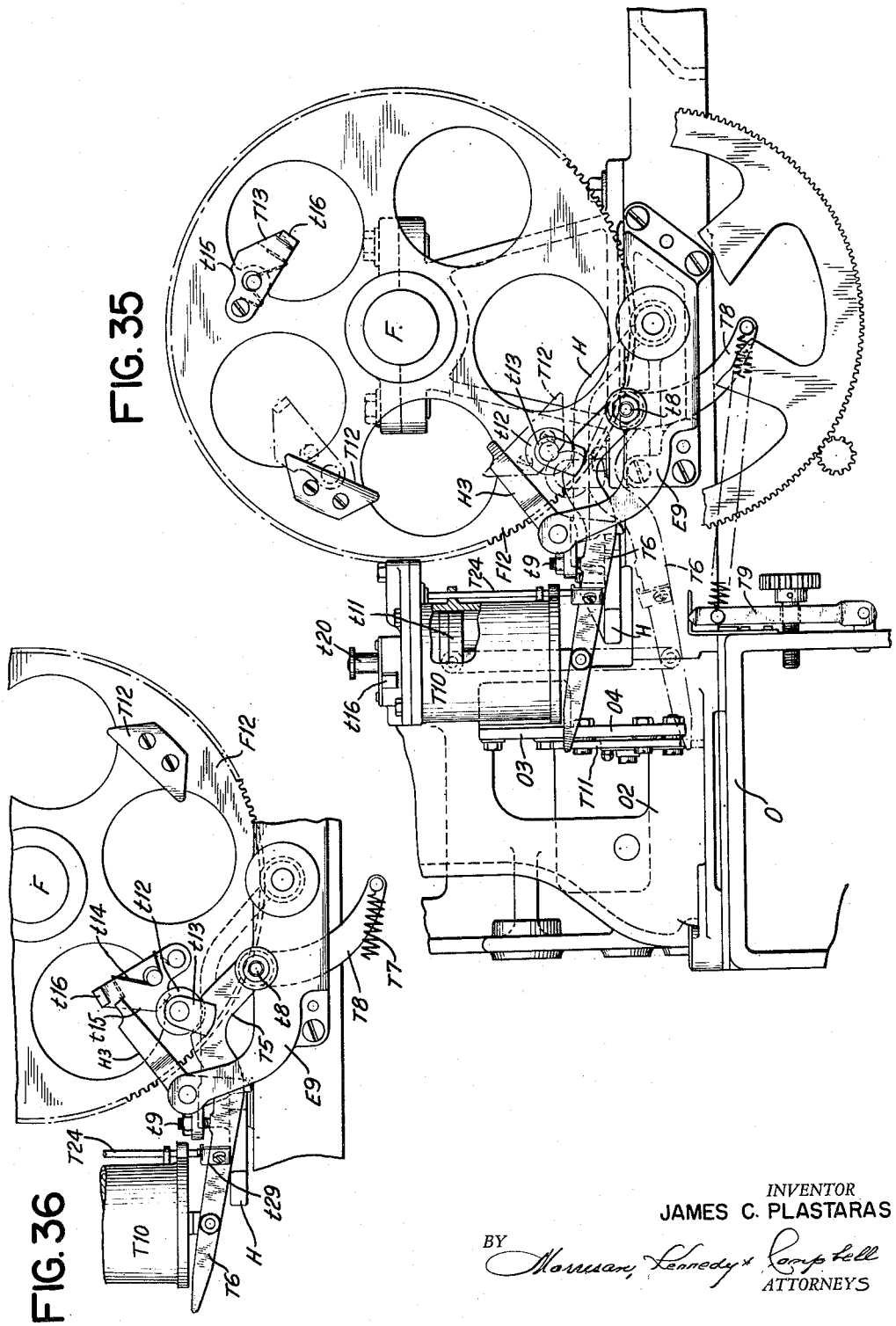
INVENTOR
JAMES C. PLASTARAS
ATTORNEYS Oct. 19, 1954 J. C. PLASTARAS 2,691,924
PHOTOCOMPOSING MACHINE
Filed Sept. 9, 1950 23 Sheets-Sheet 20
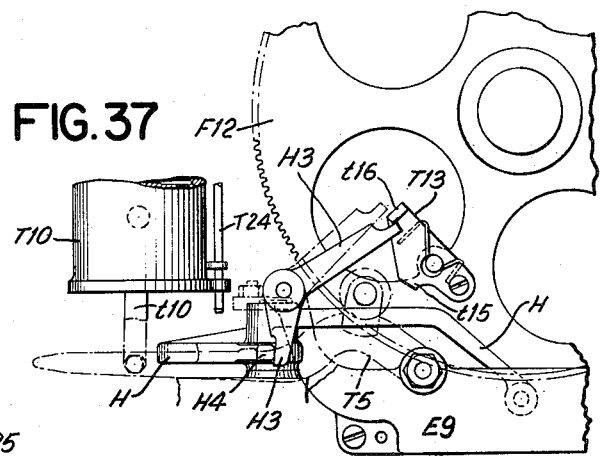
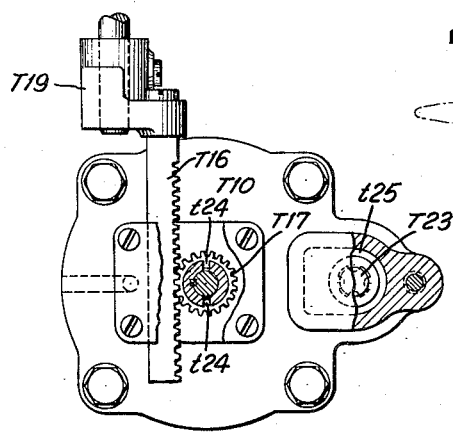
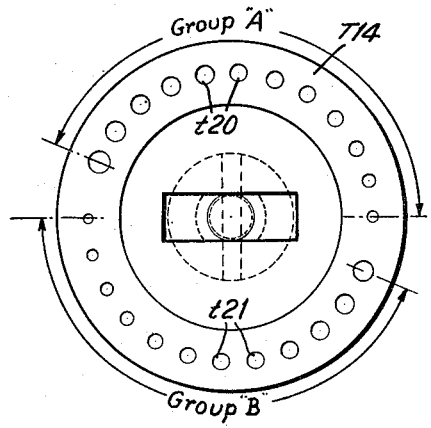
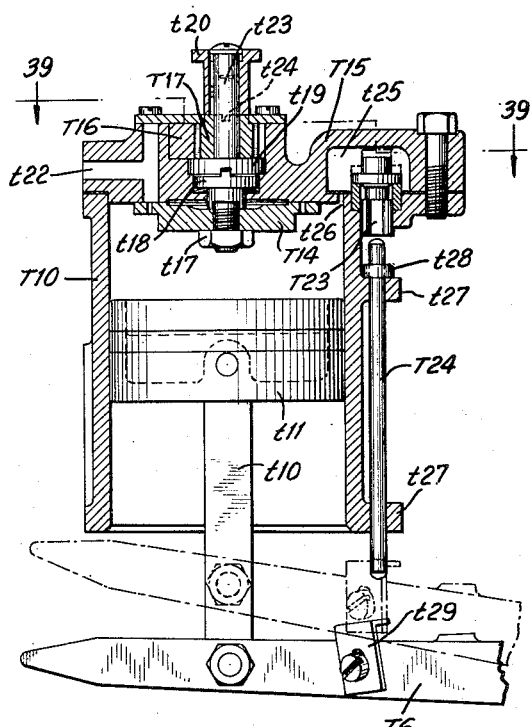
INVENTOR
JAMES C. PLASTARAS
ATTORNEYS Oct. 19, 1954     J. C. PLASTARAS     2,691,924
PHOTOCOMPOSING MACHINE
Filed Sept. 9, 1950     23 Sheets-Sheet 21
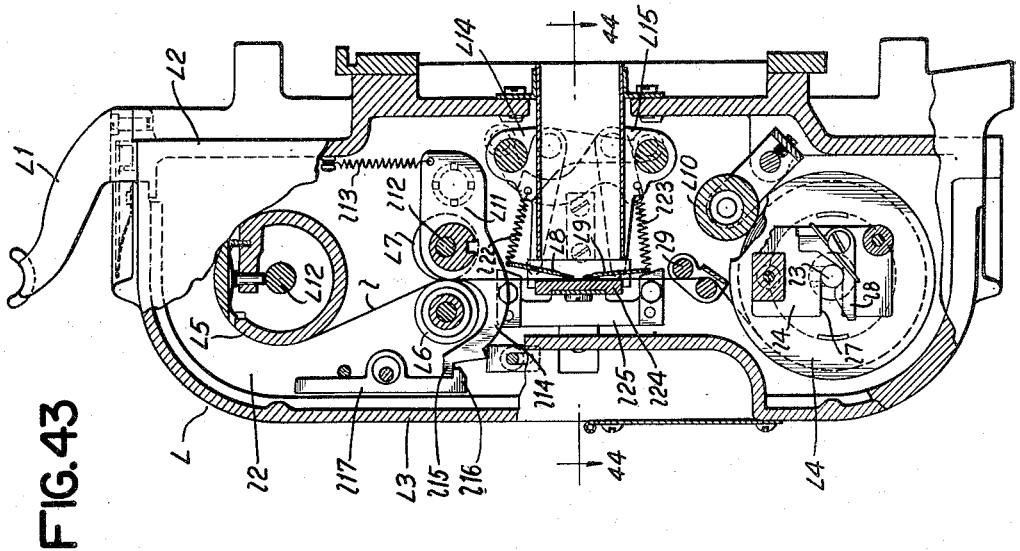
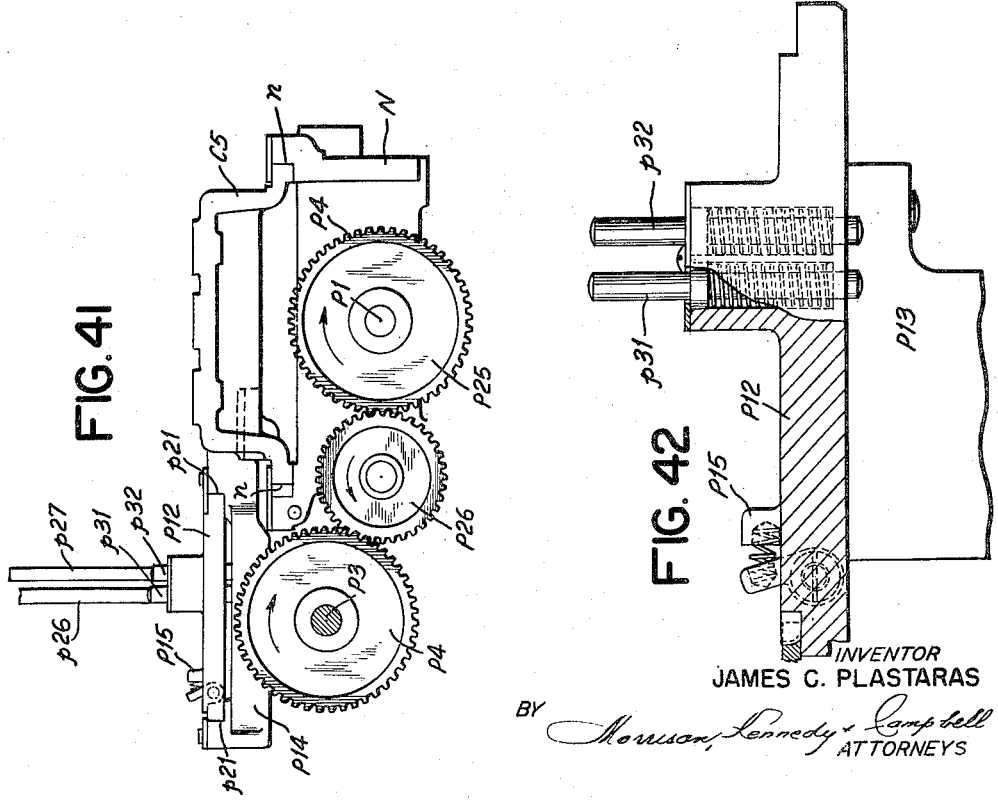
INVENTOR
JAMES C. PLASTARAS Oct. 19, 1954  J. C. PLASTARAS  2,691,924
PHOTOCOMPOSING MACHINE
Filed Sept. 9, 1950  23 Sheets-Sheet 22
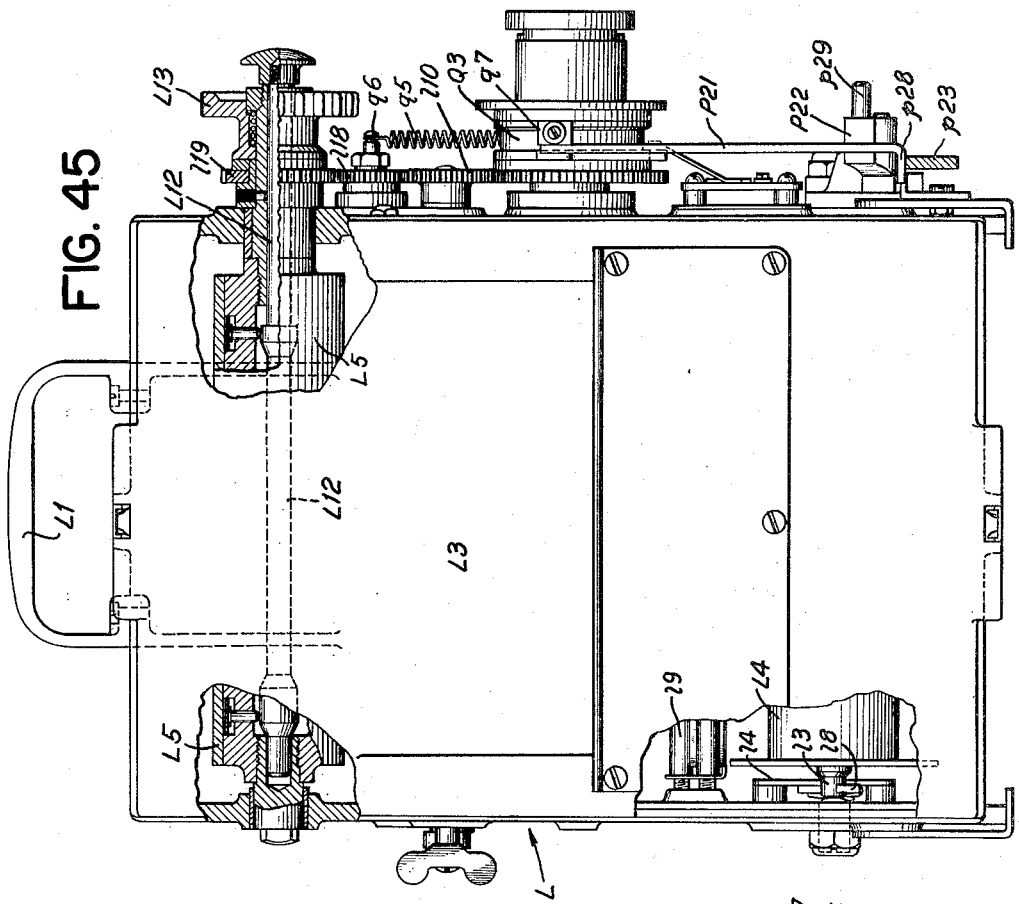
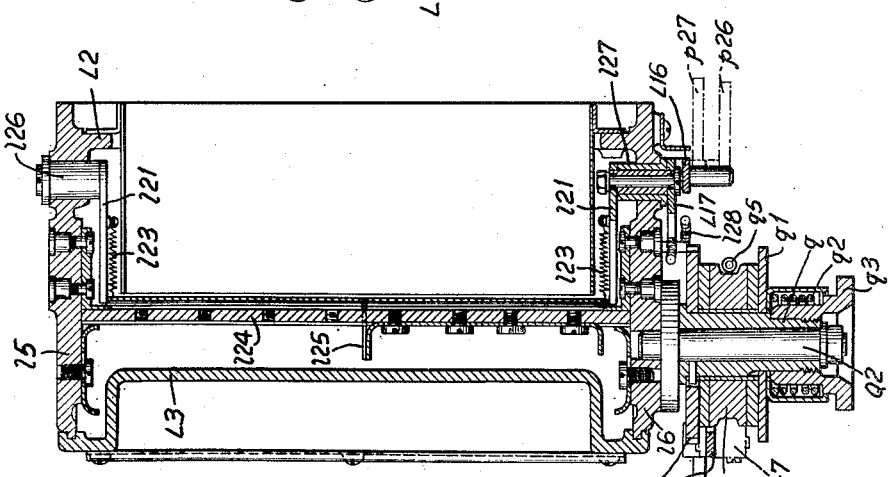
INVENTOR
JAMES C. PLASTARAS
BY Morrison, Kennedy & Campbell
ATTORNEYS

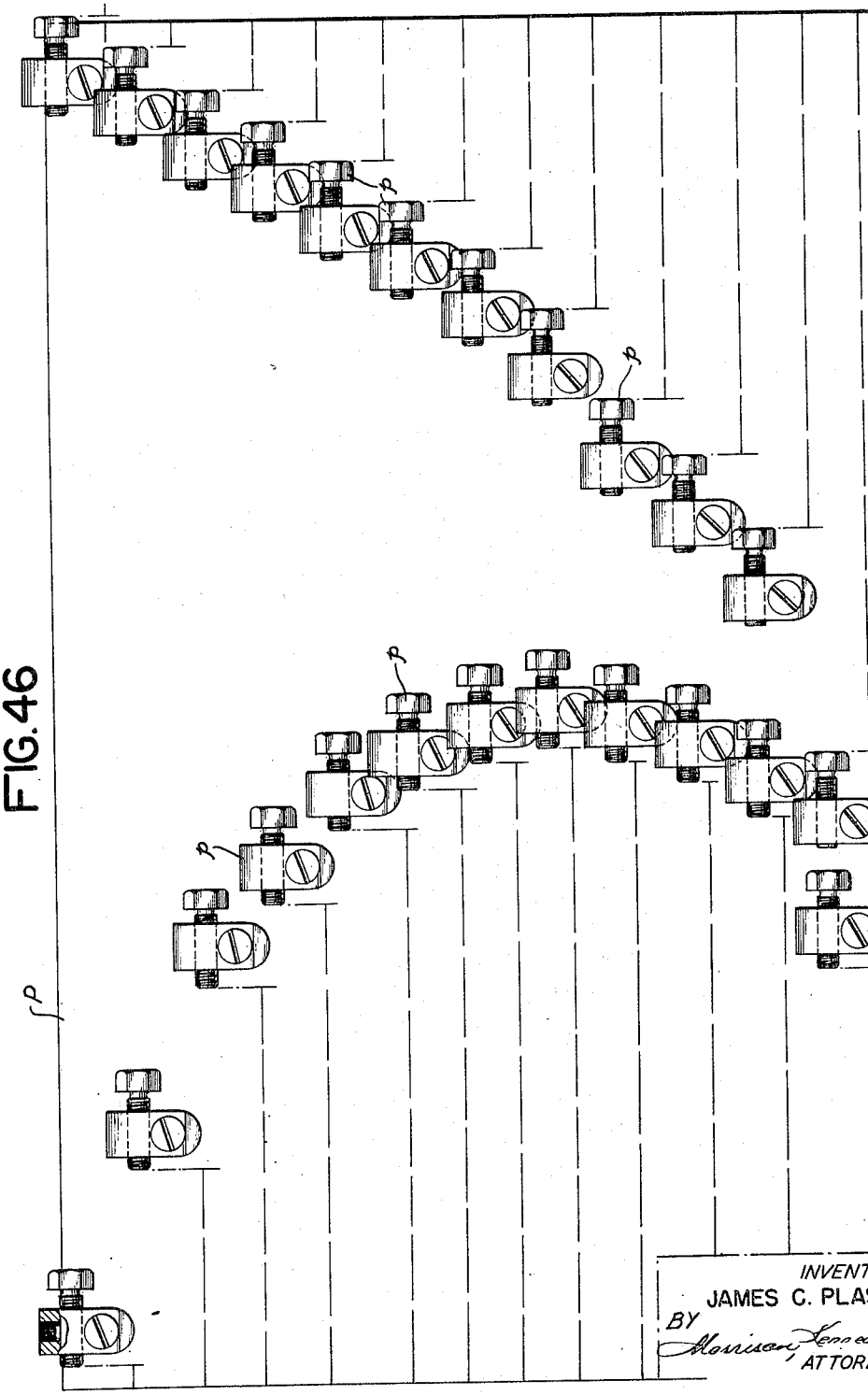

Patented Oct. 19, 1954

2,691,924

UNITED STATES PATENT OFFICE 2,691,924

PHOTOCOMPOSING MACHINE

James C. Plastaras, Lynbrook, N. Y., assignor to Mergenthaler Linotype Company, a corporation of New York Application September 9, 1950, Serial No. 184,038

40 Claims. (Class 95—4.5)

This invention is directed to improved means and mechanism obtained as a result of extensive experimentation whereby a machine in the well known Linotype class may be converted into one especially adapted to photocomposition, the product of such machine to be a film instead of a cast slug, having positive transparency, i. e., black characters on a clear background, which may be used directly for making deeply etched offset plates as well as gravure cylinders or plates. The film also may be contact-printed to produce negatives suitable for albumin offset plates and photoengravings.

The Linotype model selected for the present experiment is one of the smaller, high speed variety, the melting pot and mold being replaced with a camera structure and a simpler and much shorter cam shaft arrangement employed so as to afford the additional fore and aft space required to accommodate the different parts of said structure.

The matrices in general form and size are like those used in Linotype machines and are handled on their way through the machine in precisely the same way, being released from a storage magazine in the order in which their characters are to appear in print by the operation of a keyboard, and then assembled in line together with expansible spacebands, the composed line lifted in an assembler elevator to locate the line between the depending fingers of a horizontally reciprocable slide which thereupon is actuated to deliver the composed line into a vertically movable line transporter or so-called "first elevator" and at the same time start the machine cycle of operation. The transporter then descends to position the line between a pair of vise jaws where it is properly justified in front of the camera and a photographic exposure made of the matrix characters in the line. After the exposure the transporter is raised to a level above its normal position, where the composed line is transferred therefrom to carry the matrices into engagement with the ribbed bar of a "second elevator" which lifts them to the distributing level. As the second elevator starts its ascent, the spacebands of the composed line are shifted through a "transfer channel" to their respective magazine, and as the elevator arrives at the distributing level, the matrices are shifted therefrom into a distributor box where they are separated from one another and finally returned through the regular screw mechanism, to the magazine from which they started.

The characters of the present matrices, however, preferably are formed of a white enamel inlay in a facing of black plastic in order to obtain the best results through reflected light when they are photographed. The matrix characters also are located on the matrices for universal base alignment in order to avoid any vertical adjustment of the first elevator in relation to the optical axis of the lens when a point size enlargement or reduction is desired. Two letter matrices up to fourteen points and single letter matrices for the larger faces may be used.

The vertical alignment of a composed matrix line preparatory to the exposure follows the regular Linotype principle except that a two ribbed bar movable to and from active position is employed instead of a slug casting mold.

The camera is equipped with a six inch focus process lens and by conveniently controlled adjustments is adapted to cover a range of image magnifications up to three times the size of the object as well as a range in reduction to one-half the actual size thereof. The lens is carried on a frame member, slidably mounted in suitable guideways of the camera support or base, and behind this member and mounted in the same guideways is the camera head which in turn supports the film holder and is connected to the lens carried through the medium of a helical spring and lead strap so that there will be a constant tendency to pull both the head and lens carrier of the camera toward each other to shorten the distance between them, an intervening collapsible bellows, of course, being provided which will permit the movements of said camera members both toward and from each other different distances, within certain predetermined or prescribed focusing limitations. The film holder is detachably secured to the camera head and is equipped with mechanism operable to feed the film, step by step, for line spacing, as well as with adjustable means to limit the area of the film to be exposed for lines of different selected point sizes. Such means is in the form of two adjustable cooperative plates or masks which serve also to prevent light from reaching the film when the film holder is removed from the machine either for the processing of an exposed film, or for the substitution of an extra holder containing a fresh film in order that composition may be carried on uninterruptedly.

According to the present arrangement, the range of magnification and reduction is divided into twelve main convenient steps capable of individual subdivision. For example, if a twelve point matrix font happens to be the one preferred, the following point size images are obtainable: 36, 30, 24, 21, 18, 16, 14, 12, 10, 9, 8 and 6. These settings are determined by twelve pairs of adjustable banking blocks or "focusing stops" carried by a common rotatable drum or cylinder, the stops of each pair being spaced different distances apart and those of the different pairs being located in different angular positions about the outer surface of the drum. Any selected pair of these stops may be brought into active or functioning position at will by a rotatably adjustable, cylindrical dial after the camera has been fully extended against the tension of the helical spring already referred to. The dial is appropriately marked and secured to the front end of a fore and aft shaft which is geared to the stop drum so that the setting of the latter for any particular focusing condition of the camera may be instantly effected. The camera is extended by the longitudinal movement in opposite directions of a pair of rack bars controlled by a hand wheel arranged in a panel conveniently located at the front of the machine, one of the rack bars being connected through gear mechanism to the camera head, and the other rack bar through the same mechanism to the lens carrier. The arrangement is such that while the camera is fully extended the focusing drum may be turned to the proper adjusted position and the helical spring then allowed to pull both sliding members of the camera under control of the hand wheel toward one another until each banks against its respective focusing stop of the pair selected.

The increments through which the film is fed as well as the area of the film exposed by the two mask plates must be increased or decreased according to the point size of the image. Consequently and according to the present invention, the setting of the focusing stop drum by a rotary adjustment of the cylindrical selecting dial will also bring about through means later to be described, the appropriate settings for both the film feed and mask plates. In other words, these three adjustments are automatically effected by the setting of the dial while the camera is in its extended condition.

Provision is also made whereby the extent of the film feed and mask adjustments may be changed as desired to correspond to the point size of the particular matrix font in use.

Subsidiary means associated with the film feed actuating devices and controlled by hand set means located conveniently below the cylindrical dial permits the normal spacing between lines to be increased as desired within a twelve point range. Furthermore, for certain types of print matter where wide spacing between paragraphs is demanded, the film may be fed manually one line space at a time by each complete turn of a relatively small hand crank also mounted in the control panel at the front of the machine.

The characters of a justified line of matrices are illuminated by two fluorescent tube lamps arranged parallel and close to the line, one above and one below the same. The optical axis of the lens is on a level with the alignment line of the matrix characters so that the reflected light therefrom may be picked up by the lens and projected to form an image on the film. The size of the aperture in the lens shutter as well as illumination is constant and the time of exposure therefore, is changed for every camera setting in order to obtain a clear and sharply defined image regardless of the point size of the characters therein. To bring about this result, in the preferred embodiment illustrated, the shutter of the camera is first opened at a definite point of the machine cycle of operation and then closed by a cam actuated, spring controlled lever which is connected to the piston of an air dash pot, the latter being equipped with adjustable means operable automatically and whereby the return stroke of the piston as well as the lever may be retarded and in this way determine the closing time of the shutter. In other words, and to be more explicit, the dash pot at its closed end is provided with a rotatably adjustable disk formed with two series of perforations or vents of different sizes and adapted individually under different adjustments of the disk, to permit the escape of air ahead of the piston, and thus regulate the speed at which the piston and the connected lever are restored to normal position by action of the control spring. The closing of the shutter is effected by the return movement of the cam actuated lever as the piston completes its return stroke, and the turning or adjustment of the disk to its different angular positions for the selection of the appropriate vent for any particular camera setting, is controlled by a cam plate carried by the lens supporting slide through intermediate connections later to be described.

One of the two clamping jaws between which the composed matrix lines are justified, is relatively fixed as in the regular Linotype machine and determines the theoretical ends of the lines. Consequently, and in order that the clamping edge of this jaw may be projected on a constant vertical line on the film under all conditions of magnification, the lens is capable of independent lateral adjustment in its support, such adjustments in the present instance, being effected automatically by means of a stationary, segmented plate cam, as said support is moved to different positions relatively thereto under the prescribed camera settings.

Means controlled by a push button are also provided for cancelling a defective line before exposure after it has been sent into the machine. Operation of the push button prevents the opening of the shutter and the advance of the film, so that the line may pass through the machine and later be recomposed if desired. Two other push buttons for starting and stopping the rotation of the cam shaft during a machine cycle are also provided. Such control elements together with the two hand wheels before mentioned are arranged in the same panel which is readily accessible to an operator seated at the keyboard.

The foregoing as well as other features of the improved machine including safety device, etc., will be clearly pointed out in the detailed description to follow. In the accompanying drawings the invention has been shown in preferred form only and is therefore not limited to any specific form or embodiment except in so far as such limitations are specified in the appended claims.

Referring to the drawings—

Fig. 1 is a side elevation partly in section, showing the film feed mechanism, adjusting devices therefor and the relative positions they occupy when the camera is fully extended, and showing also other parts of the improved machine including the first elevator or line transporter and the matrix aligning member in their normal positions;

Fig. 2 is a side elevation similar to Fig. 1 with certain parts omitted, showing the camera properly adjusted to produce an image 12 pt. in size, from a line of matrix characters of the same size;

Fig. 3 is a detail showing two views of one of the two-letter matrices employed;

Fig. 4 is a rear view of a justified line of the single letter matrices employed and indicating in dotted lines the two clamping jaws therefor;

Fig. 9 is a vertical section taken approximately on the line 9—9 of Fig. 6 to show more clearly the operation of the short line safety device;

Fig. 10 is a side elevation partly in section showing the push button, parallel link device for stopping and starting the operation of the machine, as desired;

Fig. 11 is a horizontal section taken on the line 11—11 of Fig. 10;

Fig. 12 is an elevation similar to Fig. 10 but showing the "stop" push button locked in its active position;

Fig. 13 is a top plan view of the connections between the parallel link device and the main clutch control lever, showing the parts shifted in one direction to stop the operation of the machine;

Fig. 13a is a view similar to Fig. 13 but showing the parts shifted in the opposite direction to start the operation of the machine;

Fig. 13b is a view similar to Fig. 13 but showing the parts standing in a neutral position to permit the machine to operate normally;

Fig. 14 is a vertical section showing on an enlarged scale, the cam actuated, film feed control devices and their intermediate connections in normal position, the film feed adjusting devices, the focusing drum, the supporting slide for the camera head and other co-related parts of the machine;

Fig. 15 is a vertical section on the same scale as Fig. 14, showing the film feed control devices in active position, and the automatic as well as the manual means for actuating said devices;

Fig. 16 is a front elevation partly in section and broken away, showing the manual means for actuating the film feed control devices, in a different position;

Fig. 17 is a side elevation showing the connections between the cam shaft and control plate whereby a composed matrix line may be cancelled when desired, and showing also the manual means for actuating the film feed control devices;

Fig. 18 is a top plan view partly in section, showing the means controlled by a push button operable at any time during the first ninety degrees of a cycle, whereby the film feed clutch may be locked out of action and the exposure of a composed line to be cancelled, may be prevented;

Fig. 18a is a detail vertical section taken on the line 18a—18a of Fig. 18;

Fig. 19 is a top plan view of the cam actuated means for operating the arm which controls the operation of the distributor slide;

Fig. 20 is a top plan view showing the film feed, control shaft and the sleeve connection through which said shaft is operated;

Fig. 21 is a detail front view showing the hand set adjusting means whereby the partial rotation of the film feed, control shaft may be increased as desired for greater line spacing;

Fig. 22 is a longitudinal section on an enlarged scale and taken on the line 22—22 of Fig. 21;

Fig. 23 is a side elevation showing the cam actuated means for operating the arm which controls the operation of the distributor shifter slide;

Fig. 27 is a vertical section through the film feed and mask adjusting devices and the rotatably adjustable control dial therefor; and showing also the film holder and the mechanism it carries in operative relation to said devices;

Fig. 28 is a top plan view showing the main slide whereon the camera head and film box are supported, and the subsidiary slide which is attached to the main slide and carries the film feed and mask adjusting devices;

Fig. 29 is an elevation of the cylindrical dial assembled, showing its support, the shaft it controls and the fixed housing through which one row of the dial markings is disclosed;

Fig. 30 is a development of the cylindrical dial;

Fig. 31 is an end view of the cylindrical dial detached, and indicating the twelve steps through which it may be rotatably adjusted;

Fig. 35 is a side elevation showing the driving connections for the cam shaft, the spring controlled cam actuated lever for opening and closing the camera shutter, the air dash pot controlling the return stroke of said lever, and the means for automatically disengaging the main clutch momentarily during a cycle of operation, as required for extremely long exposures;

Fig. 36 is a side elevation showing certain parts of the mechanism illustrated in Fig. 35, in a different position;

Fig. 37 is an elevation showing the parts illustrated in Fig. 36 in a different position;

Fig. 38 is a vertical section through the air dash pot, showing the rotatably adjustable, perforated disk for regulating the escape of air ahead of the piston, the spring controlled lever operatively connected to the piston rod and the rack and pinion device for effecting the adjustments of said disk;

Fig. 39 is a horizontal section taken on the line 39—39 of Fig. 38;

Fig. 40 is a detail on an enlarged scale, of the rotatably adjustable disk and the two groups of concentrically arranged perforations or air vents therein;

Fig. 41 is a front view showing the train of gears through which the rotary adjustments of the focusing drum are effected, and showing also the means carried by the subsidiary slide for sustaining the mask adjusting elements in their proper position;

Fig. 42 is a front view of the subsidiary slide partly in section and broken away to show certain details in the construction of parts carried thereby;

Fig. 43 is a vertical section, partly in elevation, of the film holder showing the arrangement of the various parts mounted therein and including the supply and rewinding spools, mask plates, etc.;

Fig. 44 is a horizontal section of the film holder taken on the line 44—44 of Fig. 43;

Fig. 45 is a rear view of the film holder partly in section and broken away to show certain details; and Fig. 46 is a development of the camera focusing stop drum.

Figure 5:
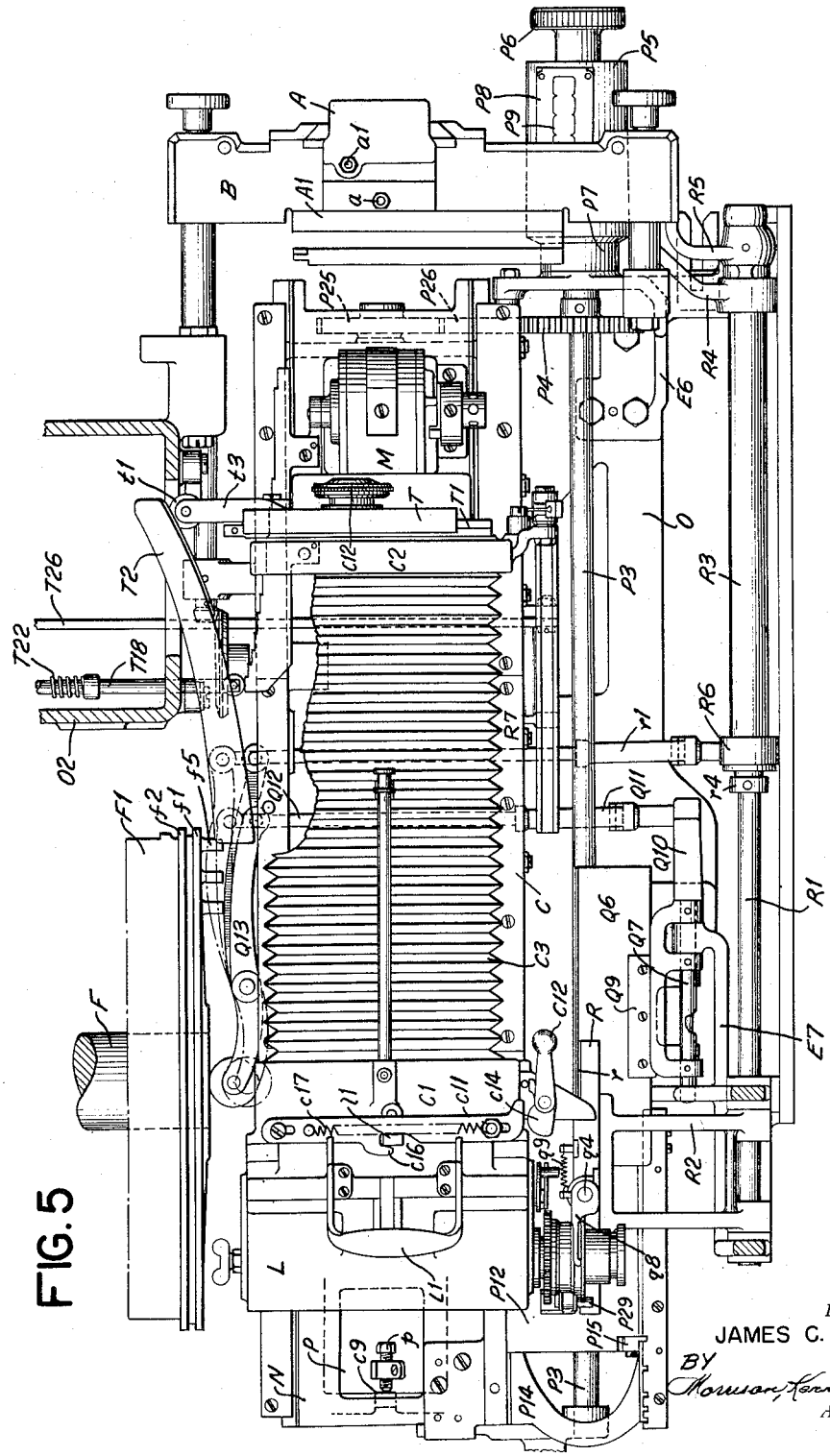
Fig. 5 is a top plan view, showing the camera fully extended, the film feed and clutch control devices therefor, and parts of the lens adjusting and exposure control connections.

A composed line of matrices $x$ and spacebands $y$, Figs. 3 and 5, is delivered as usual, and in the manner previously described into a vertically movable line transporter or first elevator A slidably mounted in the so-called vise frame B and formed with a horizontally channeled, head portion A' which overhangs said frame and wherein the composed line is supported. Normally or when the machine is at rest, the elevator A stands in the position shown in Fig. 1, but as soon as a composed line is delivered thereto at the beginning of a machine cycle, the elevator descends with the line to the position indicated in dotted lines, Fig. 2, where it is sustained by the engagement of a banking screw $2a$ upon the top of the vise frame B, so as to present the matrix line between a pair of clamping jaws $B^1$, $B^2$ and directly in front of a camera C. While located in this position the composed line is justified in the usual Linotype way, by means later to be described, and the matrix characters of the line are illuminated by two fluorescent tube lamps 5 which are supported from a conveniently located part of the machine through the medium of a depending bracket member 6, and are arranged one above the other behind the line in parallelism thereto. After the exposure, the elevator A is raised to carry the composed line upwardly into register with the upper transfer channel 7 (Fig. 1) where the matrices $x$ are transferred from the first elevator A onto a second elevator (not shown) preparatory to final distribution, while the spacebands in the line are shifted through said channel directly into their usual storage magazine.

The matrices $x$ (Figs. 3 and 4) like those used in commercial Lintoype machines, are formed on their opposite edges with the upper and lower projecting ears $x^1$, $x^2$ and at their upper ends with a V-shaped tooth combination notch $x^3$, but unlike those matrices, the matrices $x$ are provided with white inverted characters on a black background, so that they may be readily photographed by reflected light. Also, the characters as shown in Fig. 4, are preferably located on the matrices for universal base alignment instead of the usual top alignment, and the spacebands $y$ are chemically blackened to correspond with the black background of the matrices. Otherwise they are identical both in shape as well as in size, with the regular Linotype spacebands, each comprising (Figs. 2 and 9) a relatively short wedge shaped member $y^1$ formed with projecting ears $y^2$, and a longer wedge shaped member $y^3$ which is driven upwardly through a composed line at the time of justification. While there are several methods for producing matrices with such characters the one used in the present instance is to mold on the brass body of the matrix a black plastic face $x^4$ (Figs. 3 and 4) which carries the character in the form of a white inlay $x^5$. The body of the matrix is recessed and undercut to retain the plastic face $x^4$ as shown in Fig. 3, and white enamel first is sprayed to fill the character recess in the plastic face, and then is shaved from the surrounding area so as to leave a sharply defined character.

Figure 6:
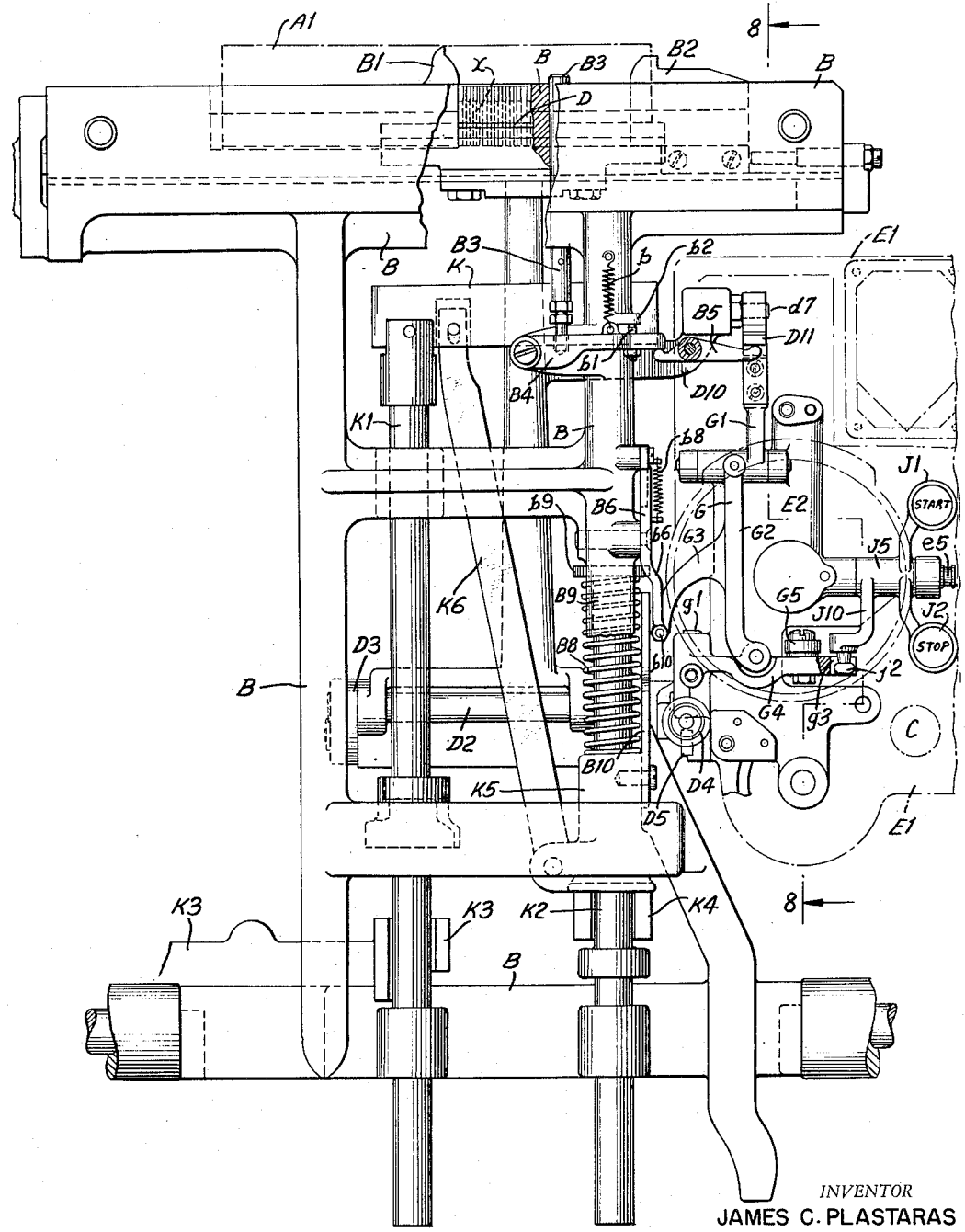
Fig. 6 is a front elevation of the vise frame and justification mechanism showing two safety devices for stopping the operation of the machine, one, in the event the first elevator in its descent from normal position should fail to seat properly on top of the vise cap, and the other in the event a line too short to justify properly, should be sent into the machine.
Figure 7:
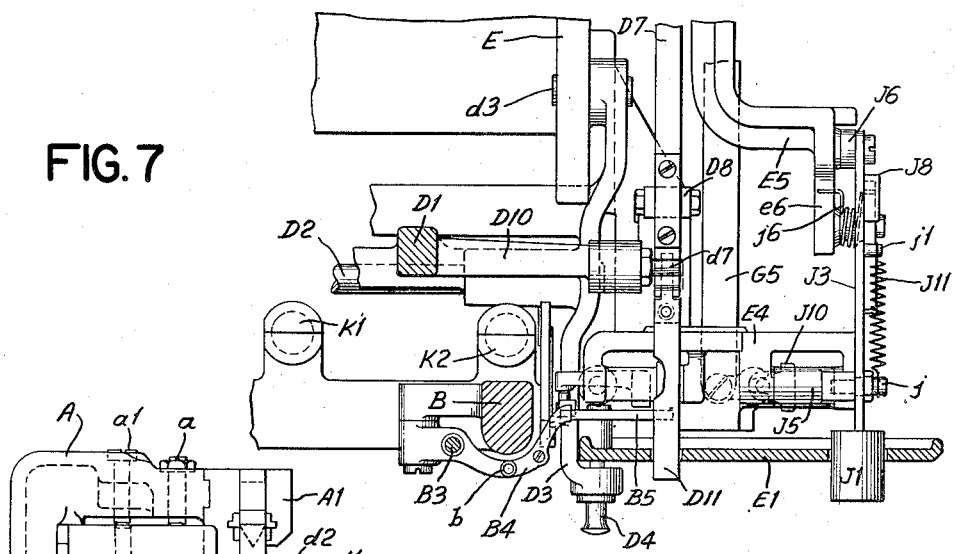
Fig. 7 is a horizontal section taken on the line 7—7 of Fig. 6.
Figure 8:
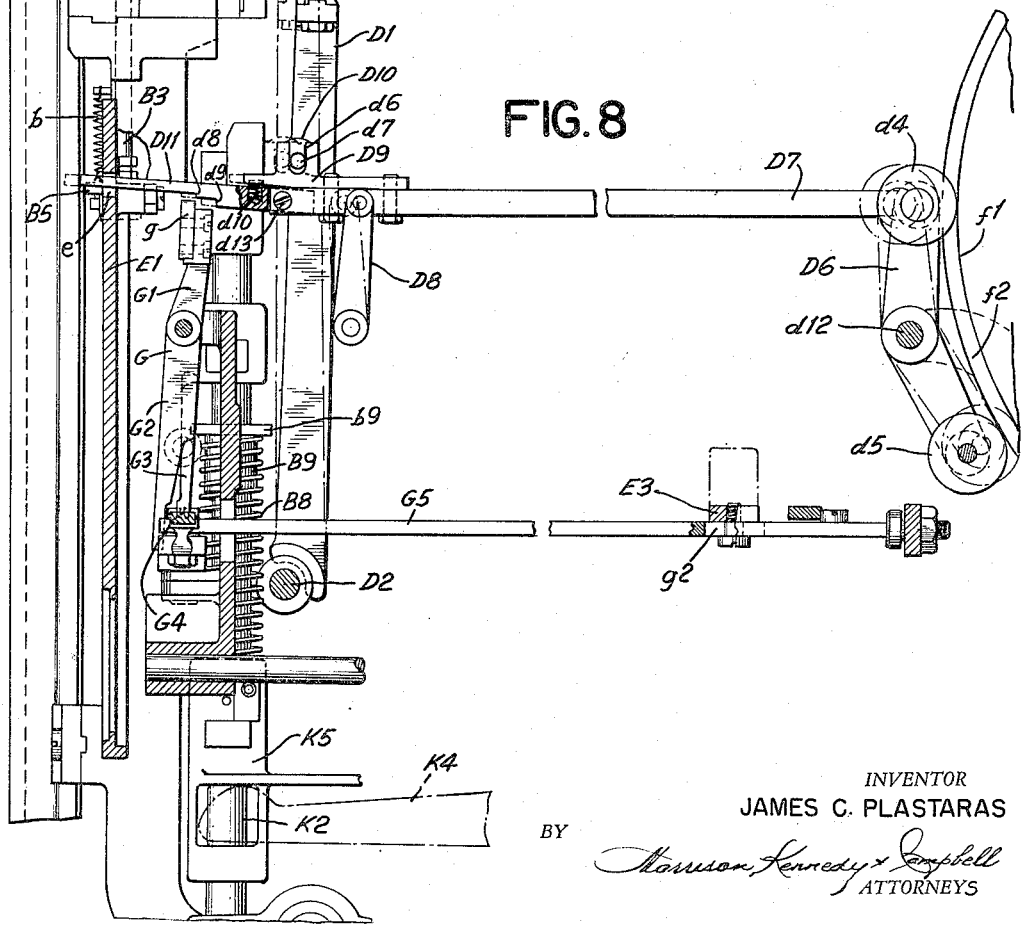
Fig. 8 is a vertical section taken on the line 8—8 of Fig. 6 and showing safety means for stopping the operation of the machine in the event the first elevator should fail to seat properly upon the vise frame.

In order that the composed lines may be properly justified and the individual characters of the matrices brought into accurate vertical alignment, there is provided a horizontally disposed bar D which according to the invention, is adapted to sustain the matrices by their lower projecting ears $x^2$ during the justifying and aligning operations. As best shown in Figs. 6, 8 and 9, the bar D is secured to the upper end of an upright member $D^1$ and is formed with two aligning ribs $d^1$ and $d^2$ extending longitudinally thereof, the rib $d^1$ being arranged to cooperate with matrices standing at the normal or lower level in the first elevator A, and the rib $d^2$ being spaced slightly above the rib $d^1$ so as to cooperate with the two-letter matrices when they stand at the upper or auxiliary level in the elevator. The upright supporting member $D^1$ for the aligning bar D is mounted at its lower end upon a pivot rod $D^2$ and is operable automatically during a machine cycle, to first swing said bar forwardly to its active position shown in Fig. 9 preparatory to justification and then, immediately after the exposure, to swing the bar rearwardly to its inactive or normal position shown in Fig. 8. While the bar D is in its active position and just before the exposure, the alignment of the matrix characters is effected in the usual way by a slight rising movement of the first elevator A, the under face of the lower rib $d^1$ at such time constituting the aligning surface of the bar for matrices standing at the lower level in the first elevator, and the corresponding face of the upper rib $d^2$ serving in like manner for matrices standing at the upper level therein. Provision is also made whereby the bar D and its supporting member $D^1$ may be adjusted bodily to a slightly lower position in instances where the image sizes required are exceptionally large (above 30 pt.) and single letter matrices only, are used. To this end the pivot rod $D^2$ for the upright member $D^1$ (Figs. 1–6 and 33) is supported at its opposite ends in a bail member $D^3$ hingedly mounted on a horizontal axis $d^3$ in a stationary bracket E of the machine frame so that it may be raised and lowered as desired to locate the aligning bar D in its different adjusted positions. The movement of the bail member is controlled by a small handle $D^4$ (Fig. 1) located conveniently at the front of the machine and capable of being engaged and disengaged with and from a fixed toothed segment $D^5$ associated therewith.

The automatic operation of the upright supporting member for the alignment bar D, is effected by a vertically disposed rocking lever $D^6$ (Figs. 8 and 17) controlled from the main cam shaft F and pivoted midway between its ends at $d^{12}$ on a stationary stand bracket $E^1$ (Figs. 8 and 17) of the machine frame. At its upper and lower extremities the lever $D^6$ is provided with a pair of anti-friction rollers $d^4$, $d^5$ arranged to engage separate cam shoes $f^1$, $f^2$ on the outer edge of the cam $F^1$ keyed to the shaft F, and adjacent the upper roller $d^4$, the lever is attached to the rear end of a fore and aft rod $D^7$ which is supported near the front of the machine upon a hinged prop $D^8$ and is adapted to maintain an operative connection with the upright member $D^1$ in either of its adjusted positions. Such connection as best shown in Figs. 6 and 8 is established by means of a plate $D^9$ fastened to the rod $D^7$ and formed with a vertical slot $d^6$ arranged to accommodate a stud $d^7$ which protrudes from a lateral projection $D^{10}$ of the upright member $D^1$. At its front end the rod $D^7$ is also provided with an extension $D^{11}$ pivotally connected thereto by a screw pin $d^7$, and projecting forwardly therefrom through an aperture $e$ formed in a stationary control plate $E^1$ located within easy reach of an operator seated at the keyboard. As shown best in Fig. 8, the extension $D^{11}$ is cut away on its under side transversely of its width, so as to present two shoulders $d^8$, $d^9$ and is also recessed in its top surface at a point adjacent the pivot screw $d^7$, so as to accommodate a compression spring $d^{10}$ which reacts against an overlying portion of the slotted plate $D^9$ and tends constantly to hold the extension in normal position with its front end banking against the lower wall of the aperture $e$ in the control plate $E^1$. At such times the shoulder $d^8$ of the extension $D^{11}$, will be located in engaging relation to a vertically disposed, irregularly shaped lever G, and is adapted to actuate it to stop the operation of the machine as the rod $D^7$ is moved forwardly in the manner already described. However, by swinging the extension $D^{11}$ slightly upward in opposition to its spring $d^{10}$ to the position shown in Fig. 8, the shoulder $d^8$ will clear the lever G and permit the machine cycle to continue, uninterruptedly.

In the present instance the operation of the extension $D^{11}$ is controlled by a vertical slide rod $B^3$ (Fig. 6) through the medium of a horizontally disposed lever $B^4$ pivoted at one end to the vise frame B; and a smaller rocking lever $B^5$ which is mounted on the inner side of the control plate $E^1$ and arranged to lift the extension $D^{11}$ when the lever $D^4$ is actuated. The rod $B^3$ is mounted for a limited endwise movement in the vise frame B and is operatively connected at its lower end to the lever $B^4$. A pull spring $b$ anchored to the vise frame at a point above the lever $B^4$ holds the latter yieldingly in its horizontal position, as determined by a banking screw $b^1$ carried by said lever and normally engaging an overlying projecting ear $b^2$ of the vise frame. At its upper end the rod $B^3$ projects slightly above the top surface of the vise frame B and is located directly beneath a set screw $a^1$ mounted in the head portion of the first elevator A; the arrangement of the parts being such that as the elevator in its descent, seats upon the top of the vise frame to properly position a composed line between the clamping jaws $B^1$, $B^2$ the vertical rod $B^3$ will be depressed and through the levers $B^4$ and $B^5$, will lift the front extension $D^{11}$ clear of the lever G. On the other hand, if for any of the well known reasons, the descent of the first elevator from normal position, should be interrupted, the extension $D^{11}$ of the rod $D^7$, would actuate the lever to and through connections about to be described, stop the operation of the machine in order to avoid possible damage to the parts that might otherwise occur.

As best shown in Figs. 6 and 8, the vertically disposed actuating lever G is pivotally mounted between its ends on a stationary upright bracket $E^2$ and formed with a relatively short upper arm $G^1$, a longer depending arm $G^2$ and a third, curved arm $G^3$ which for reasons later to appear, projects laterally as well as downwardly from the arm $G^2$ into a position alongside the justification mechanism. The arm $G^1$ is equipped with an auxiliary, finished plate $g$ located directly in front of the shoulder $d^8$ of extension $D^{11}$ above referred to, while the lower extremity of the depending arm $G^2$ is located in operative relation to a smaller, horizontally disposed lever $G^4$, the latter (Fig. 6) being mounted at one end on a vertical pivot stud $g^1$ in the bracket $E^2$, and connected to a slide bar $G^5$ extending rearwardly therefrom. The bar $G^5$ is suitably supported near its rear end in a fixed bracket $E^3$ to which it is appropriately connected by a pin and slot $g^2$ and normally, or when the machine is functioning without interruption, said bar as well as the levers G and $G^4$ occupy respectively their neutral positions shown in Figs. 8 and $13^b$. However, if the lever G should be actuated, as a result of the abnormal conditions pointed out, it would in turn, swing the lever $G^4$ to the position shown in Fig. 13 and through the slide bar $G^5$, actuate a lever H to disengage the main driving clutch (not shown) and thus stop the machine cycle of operation. The disengagement of the clutch takes place as usual in opposition to the clutch spring and means are provided whereby the clutch in such instances, is automatically locked in its disengaged position. Such means include a parallel link device J (Fig. 12) operatively connected to the free end of the horizontal lever $G^4$, but subject to control by one or the other of two push buttons $J^1$, $J^2$ appropriately labeled and operable respectively to stop and restart the operation of the machine at any time during a cycle. Therefore, when the machine is stopped automatically in the manner stated, it may be restarted by operation of the proper push button $J^1$.

Ordinarily the engagement of the main clutch to start a machine cycle, is effected by the release of the clutch lever H when a hinged spring pressed plate $H^1$ carried by one of the cams on the shaft F and controlled by the operation of the line delivery slide, is swung from the position shown in Fig. 13 to that shown in Fig. $13a$; and the disengagement of the clutch at the end of the cycle is effected by the operation of the clutch lever H from devices (not shown) which are controlled by the plate $H^1$ and are adapted to function as the cam shaft comes to rest. The actuation of the plate $H^1$ is effected by an arm $H^2$ extending rearwardly from a sleeve $H^3$ which is rotatably mounted on a vertical shaft $H^4$ and provided with two other arms $H^5$ and $H^6$ located in different angular positions thereon, the arm $H^5$ being arranged to engage a stop $h$ (Fig. 33) for sustaining the sleeve in its normal position, and the arm $H^6$ being arranged to engage a stud $g^3$ near the read end of the slide bar $G^5$ and whereby a machine cycle also may be started by operation of the push button $J^1$. As the cycle is completed the bar $G^5$ as well as the lever $G^4$ are restored to their normal position (Fig. 13b) by the arm $H^6$ through its engagement with the stud $g^3$ and as the arm $H^5$ banks against the stop $h$.

The parallel link device J (Figs. 7, 10, 11 and 12), is arranged directly behind the control plate $E^1$ and includes a pair of fore and aft links $J^3$, $J^4$ disposed one above the other and operatively connected respectively to the upper and lower ends of two vertically disposed, spaced apart rocker members $J^5$, $J^6$. At the front the upper link $J^3$ is extended sufficiently to carry the push button $J^1$ which projects through an opening $e^3$ of the plate $E^1$ and is appropriately labeled with the word "Start"; and the lower link $J^4$ is similarly extended to carry the push button $J^2$ which likewise projects through an opening $e^4$ in the control plate and is appropriately labeled with the word "Stop." The lower link $J^4$ is pivotally connected to the rocker members $J^5$ and $J^6$ and is provided with an upstanding rectangular plate $J^7$, whereas, the upper link $J^3$ for reasons presently to be pointed out, is provided near its rear end with a depending rectangular plate $J^8$ and is attached to the rocker members by pin and slot connections $j$. A pull spring $J^9$ arranged between a lateral stud $j^1$ of the link $J^3$ and the pin $j$ of the front rocker member $J^5$, holds the link yieldingly in the position shown in Fig. 10. As best shown in Fig. 6, the rocker member $J^5$ is mounted on a pivot rod $e^5$ between offset ears of a fixed bracket $E^4$, and includes a depending arm $J^{10}$ which at its lower end, is provided with a stud $j^2$ engaging an open slot $g^3$ formed in the free end of the pivoted lever $G^4$ already described.

The rear rocking member $J^6$ (Figs. 7 and 10) and except for a banking shoulder $j^3$ in its rear edge, comprises a plain straight bar mounted on a pivot screw $j^4$ which is secured to a forwardly projecting portion $e^6$ of a fixed angular bracket $E^5$. The parallel link device J also includes a latch pawl $J^{11}$ for locking the parts in the position shown in Figs. 12 and 13 when the lower push button $J^2$ is pushed inwardly against the tension of the clutch spring before referred to. The pawl $J^{11}$ is pivotally mounted between its ends on a stud $j^5$ projecting laterally from the bracket portion $e^6$, and is provided with a light torsion spring $j^6$ which tends to rock the pawl $J^{11}$ in a counterclockwise direction. As best shown in Fig. 10, the pawl $J^{11}$ is sustained in its inactive position against its spring $j^6$, by a beveled corner $j^7$ at the lower end of the plate $J^8$ and which engages a corresponding beveled surface $j^8$ at the rear end of the pawl. The head of the pawl $J^{11}$ is formed with a shoulder $j^9$, and in the normal position of the parts (Fig. 10) overlies the upstanding plate $J^7$. However when the lower push button $J^2$ is actuated, the lever $G^4$ will be swung rearwardly by the arm $J^{10}$ of the front rocking member $J^5$ to stop the operation of the machine in the manner before described, and at the same time, the parts of the device J will be caused to assume the position shown in Fig. 12, with the latch pawl functioning through its engagement with the front upper corner of the plate $J^7$, to lock the lever $G^4$ and parts controlled thereby in the position shown in Fig. 13. It may be noted by reference to Figs. 10 and 12 that while the upper push button during the above operation was pushed forwardly the upper link $J^3$ as a result of the tension of the pull spring $J^9$ will be caused to resume its position relatively to the rocker members $J^5$ and $J^6$ as shown in Fig. 12. Consequently and due to the pin and slot connections $j$, there will be sufficient lost motion to the link $J^3$ to cause the pawl to be disengaged from the plate $J^7$ when the upper push button $J^1$ is actuated to restart the machine cycle of operation.

Reference again is directed to Figs. 6, 7, 8 and 9 which also show part of the line justifying mechanism and particularly certain safety connections whereby the vertically disposed irregularly shaped lever G before described, will be actuated to stop the operation of the machine if or when a composed line is too short to be properly justified, is sent into the machine. The justification mechanism, Figs. 1 and 6, includes as usual, a horizontal bar K supported at the upper ends of a pair of vertically movable, cylindrical rods $K^1$, $K^2$, and arranged to engage the space bands of a composed line supported by the first elevator A, in its justifying position between the clamping jaws $B^1$ and $B^2$. The rods $K^1$ and $K^2$ are slidably mounted in the vise frame B and are operable during a machine cycle by separate levers $K^3$ and $K^4$ which are controlled in the well known manner from the cam shaft F so as to raise the bar K in two stages to a position such as that shown in Fig. 9 and thus drive the space bands upwardly through a matrix line the varying distances required to effect its proper justifications. However, if a composed line should happen to be too short or "loose" to justify, the bar K then would be carried upwardly to the limit of its active stroke as indicated in broken lines (Fig. 9), and if the machine cycle should be allowed to continue, an exposure would be made of the defective line and probably spoil the negative. It therefore is proposed as above stated and according to the present invention to stop the operation of the machine automatically in such instances until the difficulty has been remedied. To this end, and as best shown in Figs. 6 and 9, there is provided a lever $B^6$ pivotally mounted on the vise frame B so as to rock about a horizontal axis $b^3$, and arranged alongside the vertical rod $K^2$ of the justification mechanism. The lever $B^6$ is formed with three projecting arms $b^4$, $b^5$ and $b^6$, and normally is sustained in the position shown in Fig. 9, by means of an overlying pawl-like member $B^7$ against the tension of a compression spring $B^8$ which surrounds the rod $K^2$ and is arranged between upper and lower sleeves $B^9$ and $K^5$ respectively, mounted on said rod. The pawl-like member $B^7$ is pivoted at its front end to the vise frame B and terminates at its rear end directly over an elongated upright finger piece $B^{10}$ adjustably attached to the lower sleeve $K^5$. Between its ends the member $B^7$ is formed with a tooth $b^7$ which is held normally engaged under the tension of a light pull spring $b^8$, with the upper extremity of the arm $b^4$ of the lever $B^6$. The lower sleeve $K^5$ is substantially a regular Linotype part being operated directly by the justification levers $K^4$ and connected by means of a vertically disposed strut $K^6$ to the horizontal bar K, whereas the upper sleeve $B^9$ is comparatively small and formed with a collar $b^9$ engaging the projecting arm $b^5$ of the lever $B^6$. At its lower end the third and longest arm $b^6$ of the lever $B^6$, is provided with a set screw $b^{10}$ located in engaging relation to the laterally projecting arm $G^3$ of the vertical actuating lever G before described. Consequently and according to the arrangement of the parts just described, when the justification mechanism is allowed to function in the normal way, the justification bar K during the upward movement, would be arrested by the space bands in composed lines of the proper length, and the upper end of the finger piece $B^{10}$ would then be stopped short of its engagement with the pawl member $B^7$. On the other hand, if the justification bar K should be allowed to continue its upward movement, the finger piece $B^{10}$ would lift the member $B^7$ out of locking engagement with the lever $B^6$ as indicated in broken lines, Fig. 9, and permit the compresison spring $B^8$ to actuate said lever and through the connection the latter has with the vertical lever G, stop the machine cycle of operation. Thereafter, the machine may be restarted by operation of the push button $J^1$, and allowed to complete its cycle to distribute the defective matrix line without any appreciable interruption in the course of composition.

Figure 24:
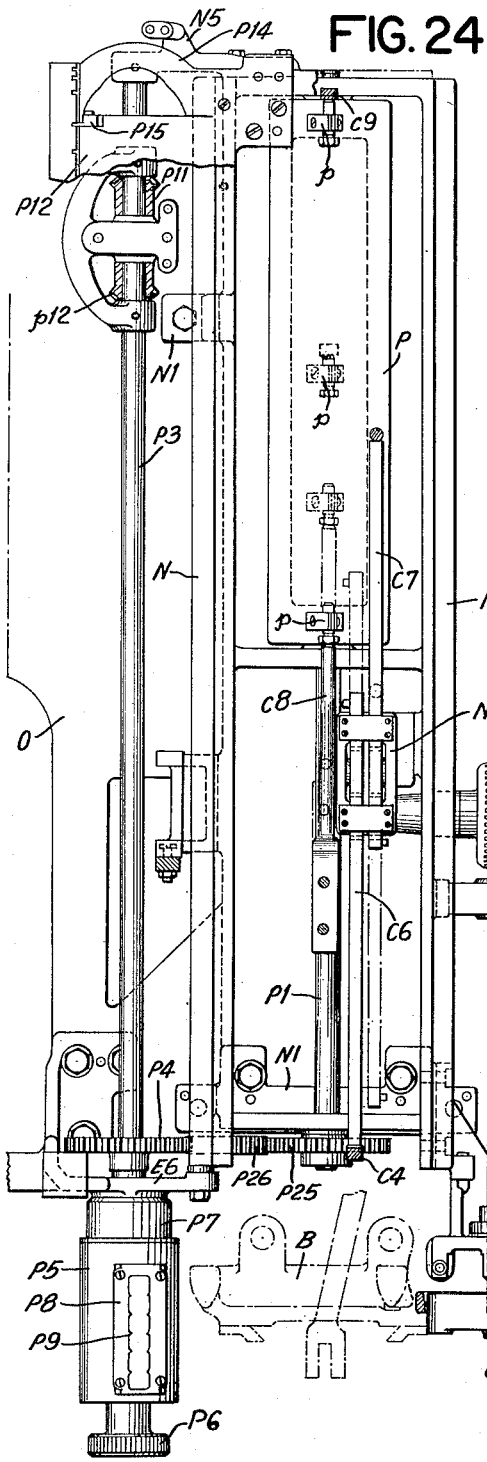
Fig. 24 is a top plan view of the camera supporting frame showing the manually controlled rack and gear mechanism for extending and collapsing the camera, and showing also the gear connections between the rotatably adjustable, cylindrical dial and the parts it controls, i. e., the focusing stop drum and the film feed and mask adjusting devices.
Figure 26:
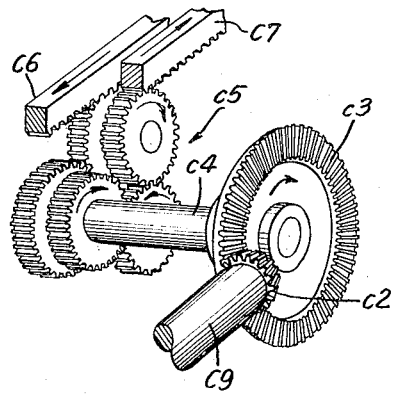
Fig. 26 is a detail perspective view of the manually controlled rack and gear mechanism.
Figure 25:
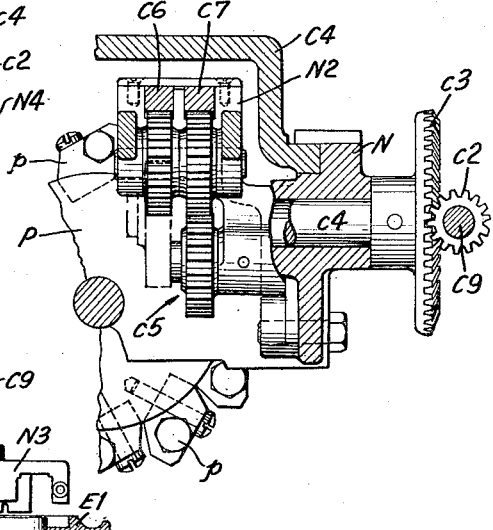
Fig. 25 is a vertical section taken on the line 25—25 of Fig. 24.
Figure 32:
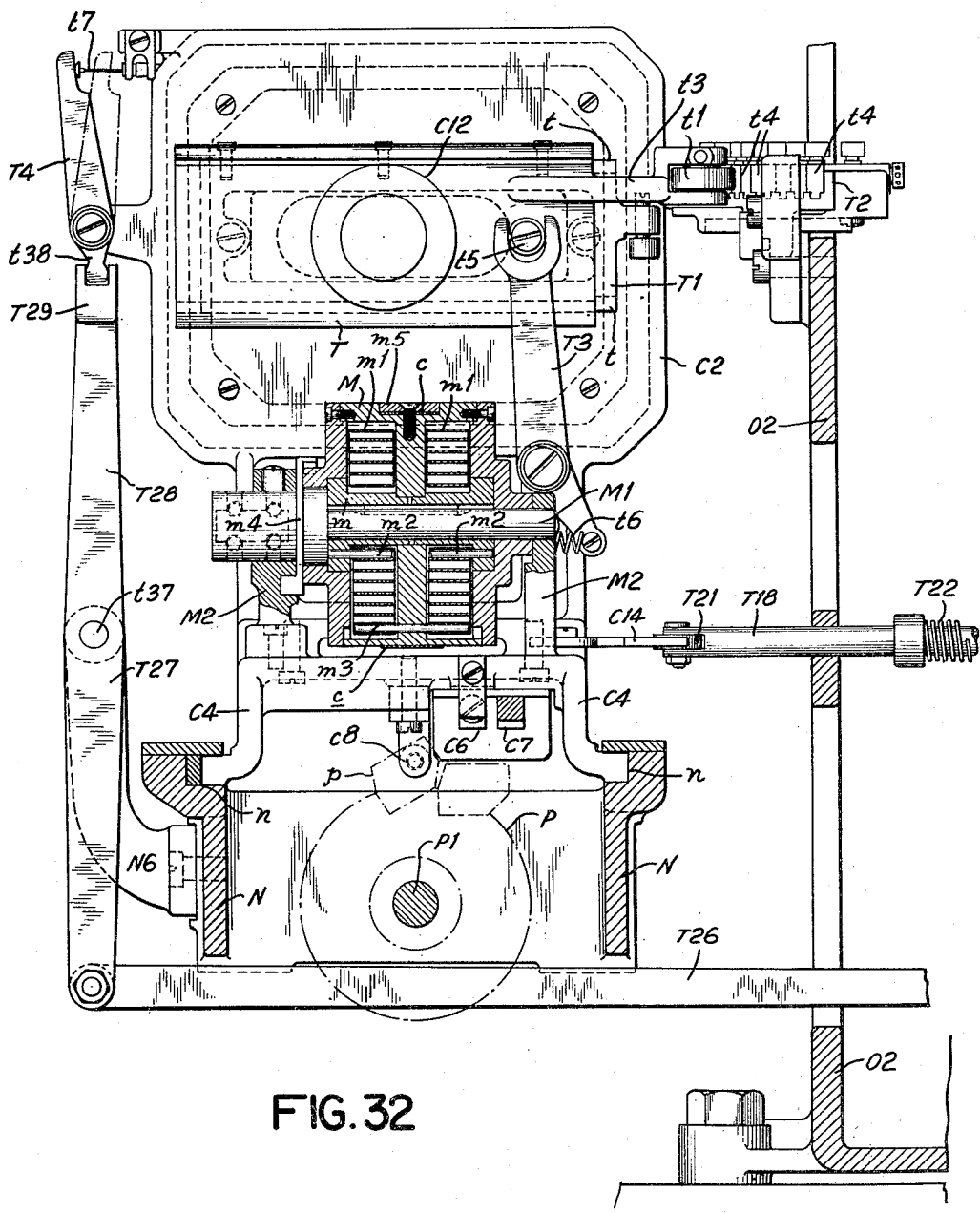
Fig. 32 is a front elevation partly in section of the lens carrier and the means for effecting the automatic lateral adjustments of the lens supporting slide; and showing also part of the cam controlled shutter actuating and exposure control connections, as well as the rotatable helical spring drum.

The camera C (Figs. 1, 2, 5, 14 and 32) includes generally, a head $C^1$, a lens carrier $C^2$, an intermediate collapsible bellows $C^3$, a film holder L detachably secured to the camera head, and a rotatable, spring actuated drum M mounted upon the base member $C^4$ of the lens carrier and connected by means of a flexible strap or band c to the base member $C^5$ of the camera head. The base members $C^4$ and $C^5$ are slidably mounted in elongated guideways n of a camera supporting frame N (Figs. 5 and 24) which extends rearwardly from the front of the machine beyond the cam shaft F, and is in turn supported by stand brackets $N^1$ bolted to the machine base frame O. The guideways n are common to both the base members $C^4$ and $C^5$ so that the camera head $C^1$ and the lens carrier $C^2$ may be capable of adjustment toward and from each other to different positions for selected camera settings. As best shown in Figs. 1 and 32, the drum M is mounted to rotate upon a sleeve m and houses a pair of helical springs $m^1$ which are anchored at their inner ends to flanges of the sleeve by separate pins $m^2$ and are connected at their outer ends by a single pin $m^3$ directly to the drum. The sleeve m is keyed to a spindle $M^1$ and the latter is mounted at its opposite ends in upright posts $M^2$ rising from the base member $C^4$, and is capable of rotary adjustment by an arm $m^4$ to increase or decrease the tension of the springs $m^1$. One end of the strap c is secured by a clamping plate $m^5$ to the outer surface of the drum M and leads from said plate partway around and beneath the outer surface of the drum to the base of the camera head, to which it is attached by a clamp $c^1$. As thus arranged, the camera head $C^1$ and the lens carrier $C^2$ are constantly urged toward each other under the influence of the springs $m^1$ while their movements in the opposite direction must be effected in opposition to said springs. For this purpose the camera adjusting mechanism includes a pair of elongated, reciprocable rack bars $C^6$, $C^7$, movable endwise in opposite directions and arranged side by side beneath the camera C. The rack bars $C^6$ and $C^7$ (Figs. 24 and 25) are mounted and properly guided in a bracket $N^2$ secured to the supporting frame N, and are operable through suitable gear connections from a hand wheel $C^8$ located conveniently in the control plate $E^1$ at the front of the machine. As best shown in Fig. 24, the hand wheel $C^8$ is attached to the front end of a fore and aft shaft $C^9$ which is journaled in fixed brackets $N^3$, $N^4$ and operative connected at its rear end by means of a pinion $c^2$ and a larger bevel gear $c^3$ to a horizontal stub shaft $c^4$, the latter (Figs. 25 and 26) being mounted transversely in the camera supporting frame N and in turn connected to a set of spur gears $c^5$ for imparting the reciprocal movements to the rack bars $C^6$ and $C^7$. At its front end the rack bar $C^6$ (Fig. 1) is provided with a banking screw $c^6$ directly opposed to a cross rib of the base member $C^4$ for the lens carrier, and similarly the rack bar $C^7$ at its rear end is directly opposed to a stud $c^7$ depending from the base member $C^5$ for the camera head. Consequently by turning the hand wheel $C^8$ in a clockwise direction both the head and lens carrier may be moved simultaneously away from each other against the tension of the springs $m^1$, until the camera is stopped in its fully extended condition; and conversely by turning the hand wheel $C^8$ in the opposite direction the springs will be allowed to act through the same connections, to collapse the camera.

The setting of the camera in its different focusing positions is accomplished as it is allowed to collapse in the manner just stated, it being noted as shown in Figs. 1 and 2 that the base member $C^4$ of the lens carrier is provided with a rearwardly projecting rod $c^8$ arranged to bank against one of a pre-selected pair of stop elements p, and that the rear wall of the base member $C^5$ of the camera head, is provided with a finished plate $c^9$ arranged to bank against the other stop p of the pair selected. As shown best in the development, Fig. 46, there are twelve pairs of these stop elements p arranged in two groups disposed about the outer surface of a rotatable drum or cylinder P, and spaced different predetermined distances apart. The drum P (Fig. 24) is secured to an elongated shaft $P^1$ which extends forwardly from the drum, and is journaled at its opposite ends in front and rear walls of the camera supporting frame N.

Rotation of the drum P to bring a selected pair of the stop elements p into active position is controlled by a rotatably adjustable, cylindrical dial $P^2$ (Figs. 24, 27 and 41), attached by a taper pin $p^1$ to the front end of a fore and aft shaft $P^3$, and operatively connected through suitable gearing to the drum shaft $P^1$, such gearing (Fig. 41) including a driving gear $P^4$ attached to the shaft $P^3$, a gear $P^{25}$ attached to the front end of the shaft $P^1$ and an intermediate idler gear $P^{26}$. The dial $P^2$ (Figs. 27 and 29) is arranged within a housing $P^5$ and provided with a handle $P^6$ mounted for a limited longitudinal movement on the front end of the shaft $P^3$. Normally, and as clearly shown in Fig. 27, the dial $P^2$ as well as the handle $P^6$ are locked against rotation by an endwise movable pin $p^2$ attached to the handle and engaging one or another of a series of concentrically arranged apertures $p^3$ (which are formed in the contiguous end of a fixed supporting member $P^7$ for the dial housing $P^5$. The handle $P^6$ is provided with a spring detent $p^4$ and its longitudinal movement on the shaft $P^3$ is limited in one direction of the body portion of the dial $P^2$ while its movement in the other direction is limited by a fillister head screw $p^5$ which projects forwardly from the contiguous end of the shaft $P^3$ into a shouldered recess $p^6$ formed in the handle $P^6$. A pair of spaced apart recesses $p^7$ in the outer surface of the shaft $P^3$ and located beneath the detent $p^4$ in engaging relation thereto, permit the latter to hold the handle $P^6$ yieldingly in its locked and unlocked positions. Thus, when the handle is pulled forwardly to the position indicated in dotted lines Fig. 27, and as determined by the head of the screw $p^5$, the pin $p^2$ will be disengaged from the fixed member $P^7$ and permit the dial $P^2$ together with the shaft $P^3$, to be turned to any predetermined angular position that may be selected in accordance with the dial markings; and then after such operation, the dial and shaft may be relocked in their adjusted position by pushing the handle inwardly to effect the engagement of the locking pin $p^2$ with the particular aperture $p^3$ which at the time, happens to register with said pin.

As best shown in Figs. 27 and 29 the dial housing $P^5$ at its rear end is secured to the member $P^7$ and on its upper side is formed with an opening $p^8$ extending longitudinally thereof and covered by a frame plate $P^8$, the latter in turn being formed with a window $p^9$ through which the dial markings are clearly visualized. The window $p^9$ is subdivided into six sections, five marked respectively 9, 12, 18, 24, 30 to designate the point size of the matrix fonts most commonly used, and the sixth window section being marked appropriately to indicate the "ratio" in point size of the enlargements and reductions obtainable from any selected one of said matrix fonts. The dial markings are printed on a label $P^9$ (Fig. 30) having six vertical columns of figures and fractions arranged so as to be read in twelve horizontal rows, one row at a time being brought into a position opposite the window $p^9$ as the dial is rotated in the manner already stated. The length of the label is such that it will fit perfectly and completely surround the dial cylinder, and the setting of the dial may be instantly effected so long as the operator associates the size of the matrix font in use with the corresponding marking located directly over one of the five sections of the window $p^9$ and devoted to matrix sizes. For example if a 12 pt. matrix font happens to be the one in use and an 18 pt. magnification is desired, the operator merely spins the dial until the number "18" appears opposite the window section marked 12. The "ratio" of enlargement is then three to two (3/2), as is also indicated under this particular seating as shown in Fig. 29. Moreover, and as a result of the latter operation, the drum P will be turned through the gear connections $P^4$ to automatically select the proper pair of stop elements $p$ for locating respectively, the head and lens carrier of the camera C in their proper focusing positions. The fixed supporting member $P^7$ (Figs. 5 and 27) is secured to an upright bracket $E^6$ and is shaped so as to provide suitable spaced-apart bearings $p^{10}$, $p^{10}$ for the front end portion of the dial shaft $P^3$ which extends rearwardly alongside the camera supporting frame N, and at its rear end is journaled in an irregularly shaped bracket $N^5$ projecting laterally from said frame. The shaft $P^3$ is also provided with a pair of bevel gears $p^{11}$ and $p^{12}$, splined thereto and adapted by their rotation to effect the adjustments of certain devices associated with the film holder L before mentioned and about to be described.

The film holder L (Figs. 43 to 45 inclusive) is box-like in form so as to provide a lightproof chamber for the film $l$, and is attached to the camera head $C^1$ by a clamping device $c^{10}$, the latter comprising upper and lower spring actuated locking bars $c^{11}$ (Figs. 1 and 5) controlled by a small hand lever $c^{12}$ and attached respectively by screw and slot connection to the top and bottom surfaces of the camera head $C^1$. The hand lever $c^{12}$ is pinned to the upper end of a vertical rod $c^{13}$, and the hub portion thereof is formed with an offset cam plate $c^{14}$ arranged to engage the contiguous end of the locking bar $c^{11}$. A similar connection with the lower locking bar (not shown) is established by a corresponding cam plate $c^{15}$ pinned to the lower end of the rod $c^{13}$. Between its ends the upper bar $c^{11}$ is formed with a hook $c^{16}$ which is held under the tension of a pull spring $c^{17}$, engaged with a lug $l^1$ projecting above the top surfaces of the film holder L when the latter is located in its proper position on the camera head $C^1$. The vertical rod $c^{13}$ is rotatably mounted in lateral spaced apart flanges $c^{18}$ of a bracket $C^{10}$, the latter being secured to the camera head and formed with upper and lower bearings $c^{19}$ later to be referred to.

At the top the film holder L is provided with a handle $L^1$ fastened to the front wall $L^2$ thereof and whereby the holder may readily be carried to and from the dark room when desired and for the reasons previously mentioned. The rear wall $L^3$ of the holder L is detachably connected thereto for access to the chamber $l^2$ and parts contained therein, when the film $l$ has to be replaced or exposed portions thereof, cut off for processing. Such parts as shown best in Fig. 43, include the film supply spool $L^4$ located at the lower end of the chamber $l^2$, the "take-up" spool $L^5$ located at the upper end of the chamber and vertically aligned with the supply spool, intermediate cooperating feed rollers $L^6$ and $L^7$, a pair of adjustable, horizontally disposed mask plates $L^8$ and $L^9$ for limiting or determining the area of the film to be exposed for each camera setting and a follower in the form of a roller $L^{10}$ arranged to engage the film on the supply spool $L^4$ and adapted to indicate by means not shown, the amount of film available. The spool $L^4$ is mounted to rotate on a shaft or arbor $l^3$ and the latter at its opposite ends is journaled in suitable brackets $l^4$ secured respectively to the opposite side walls $l^5$, $l^6$ of the film holder. At least one of the brackets $l^4$ (Fig. 43) is formed with an open slot $l^7$ to accommodate the shaft $l^3$, and is provided with a spring pawl $l^8$ for holding the shaft yieldingly in proper position against the end wall of said slot. From the supply spool $L^4$ the film $l$ is pulled directly upward in predetermined increments between a pair of horizontal guide rods $l^9$ by the two feed rollers $L^6$ and $L^7$ and thence passes onto the overlying "take-up" spool $L^5$. The feed rollers $L^6$ and $L^7$ are rotated in opposite directions by a pair of inter-meshing gears $l^{10}$ and $l^{11}$, but while the shaft of the roller $L^6$ is journaled at its opposite ends in the side walls of the film holder L, the shaft of the roller $L^7$ is eccentrically mounted in the pivot rod $l^d$ of a bail member $L^{11}$, which normally is sustained in the position shown in Fig. 43 under the tension of a pull spring $l^{13}$, with the roller $L^7$ pressing the film against the feed roller $L^6$. One arm $l^{14}$ of the bail member $L^{11}$ is extended rearwardly beneath the roller $L^6$ so that it may be rocked upwardly in opposition to the spring $l^{13}$ when desired, to relieve the film of pressure for purposes well understood. At its rear end the arm $l^{14}$ is formed with a shoulder $l^{15}$ adapted at such time to engage a corresponding lip $l^{16}$ of a vertically disposed pawl $l^{17}$ and thus sustain the roller $L^7$ temporarily in its inactive position or until access to the holder L is no longer required. The arm $l^{14}$ then may readily be disengaged from the pawl $l^{17}$ and the rear wall $L^3$ reconnected to the film holder before the latter is removed from the dark room for further use.

A friction clutch device Q (Fig. 44) is employed to impart through the medium of a relatively large gear wheel $Q^1$ associated therewith, the rotary movements to the feed rollers $L^6$ and $L^7$ as well as to the "take-up" spool $L^5$; the gear wheel $Q^1$ being arranged to mesh directly with the smaller gear $l^{10}$ for the feed roll $L^6$, and the gear $l^{11}$ for the other feed roll $L^7$, being adapted through an idler gear $l^{18}$ (Fig. 27), to rotate a gear $l^{19}$ keyed or otherwise secured to the hub portion of the arbor $L^{12}$ for the take-up spool. A hand wheel $L^{13}$ also mounted on the hub portion of the arbor $L^{12}$ is provided for conveniently rotating the spool $L^5$ after the film has been attached thereto, so as to take up the slack in the film and through suitable frictional resistance, hold it at the proper tension. The gear wheel $Q^1$ is keyed to a sleeve $q$ rotatably mounted on a fixed spindle $Q^2$, and the clutch Q includes an annularly grooved collar $Q^3$ similarly mounted upon said sleeve and capable also of a limited longitudinal movement thereon. The clutch Q also includes a disk $q^1$ and a compression spring $q^2$, the former being splined to the sleeve $q$, and the latter being arranged behind the disk so as to normally hold the clutch collar $Q^3$ frictionally engaged with the opposing face of the gear wheel $Q^1$. A screw cap $q^3$ fastened to the free or outer end of the sleeve $q$, provides an appropriate seat for the spring $q^2$, and an integral collar $q^4$ at the other end of the sleeve, sustains the gear wheel $Q^1$ against the tension of said spring in its operative position. The clutch collar $Q^3$ is faced on both sides with suitable friction material and is operated in opposition to a pull spring $q^5$ at the proper moment during each successive machine cycle, to turn the gear wheel sufficiently to advance the film $l$ step by step, in the manner already stated, and means later to be described, are provided for releasing the clutch momentarily by moving the disk $q^1$ axially away from the collar $Q^3$ and at the same time permit the latter to be restored by said spring to its original or normal position. The spring $q^5$ as indicated in Figs. 27 and 45, is attached at one end directly to the collar $Q^3$ and anchored at its other end to a stud $q^6$ projecting from the spindle upon which the idler gear $l^{18}$ is mounted.

The mask plates $L^8$ and $L^9$ (Figs. 43 and 44) which as previously stated are capable of individual adjustment toward and from each other for proper line spacing, are disposed one above the other and in length approximate the full width of the chamber $l^2$. At their opposite ends and between their upper and lower edges the plates $L^8$ and $L^9$ respectively, are pivotally connected to the side arms $l^{20}$ and $l^{21}$ of separate yoke members $L^{14}$ and $L^{15}$ journaled in the side walls of the film holder L. As best shown in Fig. 43, the plates $L^8$ and $L^9$ are held by two pairs of light pull springs $l^{22}$ and $l^{23}$ in the tilted position shown in Fig. 43, with their inner edges yieldingly engaging the front face of the film $l$, the springs $l^{22}$ being connected to the outer edge of the plate $L^8$ and anchored to the yoke member $L^{14}$, and the springs $l^{23}$ being connected to the outer edge of the plate $L^9$ and anchored to the yoke member $L^{15}$. The film $l$ at this point, is amply supported facewise, by a fixed horizontal cross bar $l^{24}$ secured at its opposite ends to the side walls of the holder L, and provided with appropriate guide members $l^{25}$ which are adapted to give edgewise support to the film and are also capable of adjustment longitudinally of said bar, to accommodate films of different widths.

Reference again is directed to Figs. 24, 27 and 28 which also show parts of the adjustable means for regulating the film feed, and for setting the mask plates $L^8$ and $L^9$ in their corresponding adjusted positions. Such means (Figs. 27 and 28) includes two spaced apart, rotatably adjustable disks $P^{10}$ and $P^{11}$ disposed directly above the rear end portion of the dial shaft $P^3$ and provided with individual bevel gears $p^{13}$ and $p^{14}$ which mesh respectively with the two bevel gears $p^{11}$ and $p^{12}$ splined to said shaft and before referred to. The gear $p^{13}$ is secured to a vertical axis stud $p^{15}$ for the disk $P^{10}$, and the gear $p^{14}$ likewise is secured to a similar axis stud $p^{16}$ for the disk $P^{11}$. At their upper ends the studs $p^{15}$ and $p^{16}$ are journaled in a rectangular overlying slide $P^{12}$, and at their lower ends said studs are seated in corresponding recesses $p^{17}$ formed in the two side arms of a yoke shaped bracket $P^{13}$ (Fig. 24) depending from the slide $P^{12}$. The arms as well as the body portion of the bracket are bored to accommodate the dial shaft $P^3$ and together provide adequate endwise support for the two gears $p^{11}$ and $p^{12}$ which are mounted on said shaft. It may be observed (Fig. 28) and for reasons presently to appear, that the disk $P^{11}$ is somewhat larger than the disk $P^{10}$, and is provided with two series of concentrically arranged banking studs $p^{18}$ and $p^{19}$, while the disk $P^{10}$ is provided with a single series of similarly arranged banking studs $p^{20}$. The banking studs of both disks are pre-set so as to stand at different levels above the upper surfaces thereof, and are adapted selectively, and through devices presently to be described, to determine the adjustments of the film feed and the mask plates $L^8$ and $L^9$. The slide $P^{12}$ is mounted in suitable guideways $p^{21}$ of a supporting frame member $P^{14}$, so as to be capable of adjustment to vary the extent of the film feed and mask adjustments according to the point size of the matrix font selected for use. The adjustments of the slide $P^{12}$ are effected manually and a spring pawl or detent $P^{15}$ carried by the slide and arranged to engage one or another of several notches $p^{22}$ formed in the top plate of one of the guideways $p^{21}$, locks said slide in its different adjusted positions. There are five of these notches marked respectively 9–12–18–24–30 to indicate the matrix fonts most commonly used and which correspond to the markings on the cylindrical dial housing $P^5$ (compare Figs. 28 and 29).

The supporting frame member for the slide $P^{12}$ (Fig. 28), is secured to the base member $C^5$ of the camera head $C^1$ and is provided with a pair of subsidiary brackets $P^{16}$ and $P^{17}$, the former serving to support a lever $P^{18}$ (see also Fig. 28) pivotally connected thereto and presenting a horizontal arm $p^{23}$; and the bracket $P^{17}$ serving to similarly support a pair of L-shaped levers P¹⁹ and P²⁰ which present two horizontal arms $p^{24}$ and $p^{25}$ respectively, as well as two upright arms $p^{26}$ and $p^{27}$ rising from the front ends of the arms $p^{24}$ and $p^{25}$. At its front end, the arm $p^{23}$ of the lever P¹⁸, engages an offset position $p^{28}$ at the lower end of a vertical link P²¹, and the latter at its upper end is pivotally attached to an ear $q^7$ projecting from the outer edge of the collar Q³ of the friction clutch Q. Near its lower end, the link P²¹ is similarly attached to a hinged guide arm P²² which carries a laterally projecting pin $p^{29}$ whereby the link may be raised to actuate the clutch against the tension of the pull spring $q^5$ in the manner and for the purpose already described. The clutch gear wheel Q¹ is sustained in its proper angular position by one of the banking studs $p^{20}$ of the disk P¹⁰, which is located (as indicated in Fig. 28) directly beneath the arm $p^{23}$ of the lever P¹⁸ and serves its purpose through its engagement with the lower end of a spring plunger $p^{30}$ mounted transversely in the slide P¹² and engaging the lower edge of the arm $p^{23}$. It also may be observed by reference to Figs. 27 and 28, that the two upright arms $p^{26}$ and $p^{27}$ of the L-shaped levers P¹⁹ and P²⁰, differ in length so that they may control the angular position of two smaller levers L¹⁶ and L¹⁷ secured respectively, to the two journal studs $l^{26}$ and $l^{27}$ of the supporting yoke members for the mask plates L⁸ and L⁹. The lever L¹⁶ is held under the tension of a pull spring $l^{28}$, against the upper extremity of the arm $p^{26}$ of the lever P¹⁹, while the lever L¹⁷ likewise, is held under the tension of a similar pull spring $l^{29}$ against the upper extremity of the arm $p^{27}$ of the lever P²⁰. To support the levers P¹⁹ and P²⁰ in opposition to the pull springs $l^{28}$ and $l^{29}$, the slide P¹² is also provided with two other spring plungers $p^{31}$ and $p^{32}$ arranged side by side directly beneath the horizontal arms of the L-shaped levers P¹⁹ and P²⁰ and banking respectively upon two of the studs $p^{18}$ and $p^{19}$ mounted in the disk P¹¹.

At its rear end, the lever P¹⁸ is formed with a short depending arm or nose portion $p^{33}$, and the levers P¹⁹ and P²⁰ likewise are formed with similarly disposed short arms $p^{34}$. The arm $p^{33}$ is directly opposed to a fixed screwstud $n^1$ mounted in an upright member of the fixed bracket N⁵ before mentioned, while the arms $p^{34}$ are arranged in engaging relation to a pin $p^{35}$ projecting laterally from the front end of a fore and aft slide bar P²³ which at its rear end, is directly opposed to a similar screw stud $n^2$ also mounted in the bracket member N⁵. The slide bar P²³ is attached by screw and slot connections $p^{36}$ to the outer ends of the subsidiary brackets P¹⁶ and P¹⁷ so that when the camera C is completely extended as shown in Fig. 1, the bar P²³ will be pushed forwardly as it engages the screw stud $n^2$ and through the pin $p^{35}$ will rock the L-shaped levers upwardly and rearwardly. As a result the lower edges of the L-shaped levers P¹⁹ and P²⁰ will at such times clear the upper ends of the spring plungers $p^{31}$ and $p^{32}$, and the lower edge of the lever P¹⁸, through its engagement with the other screw stud $n^1$, will also clear the spring plunger $p^{30}$. The springs of all three plungers then are allowed to act to raise them clear of the banking studs of both disks P¹⁰ and P¹¹ and permit the latter to be freely turned by rotation of the shaft P³ to any selected adjusted position, as determined by the markings on the dial P². It should now be clear that the adjustment of the film feed mechanism and mask plates L⁸ and L⁹, as well as the adjustment of the rotatable stop drum P, may be effected automatically for any particular camera setting, by a partial rotation of the dial P² in the manner before described.

The mechanism controlling the operation of the clutch Q and the film feed devices at the proper moments during a machine cycle, includes a horizontal bar R (Figs. 5, 14 and 18) which is supported from a fore and aft rock shaft R¹ through the medium of a bail member R², and is formed with a longitudinal rib $r$ disposed below and in operative relation to the laterally projecting pin $p^{29}$ at the lower end of the vertical link P²¹. As best shown in Fig. 5, the rock shaft R¹ at its front end, is journaled in the upright bracket E⁶ previously referred to, and at its rear end is similarly mounted in a stand bracket E⁷ bolted to the base frame O. For reasons presently to be pointed out, the operation of the rock shaft R¹ is effected through a sleeve R³ rotatably mounted thereon and provided with an angularly shaped crank arm R⁴ which is operatively connected to a similarly shaped arm R⁵ arranged in front of the bracket E⁶ and keyed or otherwise secured to the shaft R¹. The sleeve R³ also is provided with an arm R⁶ depending therefrom and connected at its lower end by means of a spring coupling $r^1$ to a horizontally disposed endwise movable rod R⁷, the latter being controlled by a cam actuated lever R⁸ located adjacent the cam F¹ before described, and pivotally mounted between its ends in a stationary bracket E⁸. For purposes of manufacture and convenience at the time of assemblage the sleeve R³ (Fig. 18) at its rear end is formed with a tapered and a threaded portion $r^2$ and $r^3$ respectively; and the depending arm R⁶ is correspondingly drilled to fit upon the tapered end portion $r^2$ and is held securely in its proper angular position thereon by a clamping nut $r^4$ mounted on the threaded portion $r^3$ of the sleeve. As best shown in Fig. 18, the shorter arm of the lever R⁸, is provided with an antifriction roller $r^5$ arranged to engage a cam shoe $f^3$ on the outer face of the cam F¹, while the longer arm of said lever is operatively connected to the contiguous end portion of the rod R⁷. The arrangement of the parts is such that as soon as an exposure has been taken of a composed matrix line during a machine cycle, the cam shoe $f$ is adapted by its engagement with the roller $r^5$, to actuate the lever R⁸ and through the horizontal rod R⁷, swing the depending arm of the sleeve R³ from the position shown in Fig. 14 to that shown in Fig. 15. As a result the rock shaft R¹ through its connection with the sleeve R³ with be turned counter-clockwise so as to swing the horizontal bar R a definite distance upwardly into engagement with the projecting pin $p^{29}$ and thus raise the vertical link P²¹ to actuate the clutch and advance the film in the manner already described. As the cycle continues and the cam shoe $f^3$ passes out of engagement with the roller $r^5$ the parts will be restored to their normal position (Fig. 14) by the weight of the horizontal bar R and its connecting bail member R².

In certain classes of print matter it is desirable that the normal spacing between lines be increased. Provision therefore is made in the present machine whereby the desired results may readily be accomplished whenever such occasions should arise. To this end the front portion R⁹ of the crank arm R⁴ (Figs. 20, 21 and 22) as well as the corresponding portion R¹⁰ of the arm R⁵ are machine finished and disposed one directly behind the other, the portion R⁹ being recessed longitudinally in its front face and formed with a row of closely spaced apart apertures $r^6$ extending transversely therethrough, and the portion $R^{10}$ being correspondingly recessed and formed with a longitudinal open slot $r^7$ which is adapted to accommodate a cylindrical housing $r^8$ for a spring plunger pin $r^9$. The housing $r^8$ (Fig. 22) is formed with an annular groove $r^{10}$ engaging the upper and lower side walls of the slot $r^7$, and the pin $r^9$ is held under the tension of its spring releasably engaged with any selected one of the apertures $r^6$. At its front end the plunger pin $r^9$ is provided with a knob or handle $r^{11}$ whereby the pin first may be withdrawn to break its engagement with the front portion of the crank arm $R^4$ and then shifted relatively thereto in the slot $r^7$ to another position that may be selected according to scale markings on the front face of the arm $R^5$. These markings (Fig. 21) indicate in points ranging from 1 to 12 the extent to which a normal line spacing may be increased. It will be noted (Fig. 21) that the row of apertures $r^6$, stand at an inclination to the longitudinal slot $r^7$ in the front portion of the arm $R^5$ so that when the plunger pin $r^9$ is shifted to the left from its normal position shown in Figs. 21 and 22, into line with one of the other scale markings, the arm $R^5$ will have to be raised slightly in relation to the crank arm $R^4$ and as a result will turn the rock shaft $R^1$ to which it is fastened, in a counter clockwise direction and thus swing the horizontal bar $R$ at the rear end of said shaft upwardly to locate it in closer relationship to the clutch control pin $p^{29}$. Consequently and since the rocking movement of the sleeve $R^3$ is constant, the active stroke of the clutch Q and the advance of the film will be increased accordingly for greater line spacing.

As previously stated, the momentary release of the clutch Q is effected by means operable to move the disk $q^1$ axially away from the clutch collar $Q^3$ and against the pressure of the compression spring $q^2$. Such means (Figs. 1, 5 and 18) include a vertical rod $Q^4$ which is mounted for a limited rotary movement in the upper and lower bearings $c^{19}$ of the bracket member $C^{10}$ (before mentioned), and is provided with two laterally projecting arms $q^8$ arranged respectively to engage the inner face of the disk $q^1$ above and below the supporting spindle $Q^2$ of the clutch. A pull spring $q^9$ connected to the upper arm $q^8$ and anchored to the bracket member $C^{10}$, holds the parts in their normal position shown in Fig. 5. At its lower end, the vertical rod $Q^4$ also is provided with an offset depending crank arm $Q^5$ directly opposed to one edge of a reciprocable, horizontally disposed plate $Q^6$ whereby the rod $Q^4$ may be actuated to release the clutch Q, irrespective of the position the camera head may occupy under the different camera settings. Reciprocation of the plate $Q^6$ is effected by the operation of a comparatively short fore and aft rock shaft $Q^7$, the latter being journaled in the stand bracket $E^7$ before referred to, and equipped with a pair of depending arms $Q^8$ between which a supporting member $Q^9$ directly attached to the plate $Q^6$, is hingedly mounted. To sustain the plate $Q^6$ in its horizontal position (Fig. 14), the auxiliary slide $P^{12}$ is also provided with a vertical stud $q^{10}$ projecting above its top surface, and engaging the under surface of said plate.

The rock shaft $Q^7$ is operable from the main cam shaft $F$ and for this reason is further equipped with a third, longer depending arm $Q^{10}$ operatively connected at its lower end by means of a spring coupling $Q^{11}$ to a second horizontally disposed cross rod $Q^{12}$, the latter like the rod $R^7$, being movable endwise and controlled by a cam actuated lever $Q^{13}$ which is located directly above the lever $R^8$ and pivotally mounted between its ends on the same vertical axis in the stationary bracket $E^8$. The longer arm of the lever $Q^{13}$ is operatively connected to the contiguous end of the rod $Q^{12}$, whereas the shorter arm of said lever is provided with an anti-friction roller $q^{11}$ arranged to engage in predetermined order of succession, during a machine cycle, two cam shoes $f^4$ and $f^5$ also secured to the outer face of the cam $F^1$. For reasons presently to be described, the cam shoe $f^4$ at the start of a machine cycle is adapted to engage the roller $q^{11}$ to actuate the lever $Q^{13}$ and through the horizontal rod $Q^{12}$, swing the longer depending arm of the rock shaft $Q^7$ from the position shown in Fig. 14 to that shown in Figs. 15 and 18. As a result, the horizontally disposed plate will be pushed ahead to actuate the crank arm $Q^5$ and thus turn the vertical rod $Q^4$ in the proper direction to release the clutch Q and hold it in such condition during approximately the first 90° of the cycle. Then, as the cam shoe $f^4$ passes out of engagement with the roller $q^{11}$ the clutch spring $q^2$ will be allowed to act and through the disk $q^1$ cause a re-engagement of the clutch. As the cycle proceeds and immediately after the clutch has been actuated to advance the film in the manner just described, it will again be released momentarily by the second cam shoe $f^5$ (Figs. 15 and 18) and thereafter remain engaged until the cycle is completed.

During the period when the clutch Q is held disengaged by the cam shoe $f^4$ there is ample time to cancel an improperly composed line after it has been sent into the machine and before it has been exposed. It is therefore further proposed according to the invention, to introduce devices operable while the clutch is thus disengaged, to prevent a re-engagement of the clutch until a moment before the machine cycle of operation has been completed. These devices include an appropriately labeled push button $Q^{14}$ (Figs. 17, 18 and 18$^a$), projecting transversely through the control panel $E^1$ and connected to one arm of a horizontal rocking lever $Q^{15}$ pivotally mounted in the fixed bracket $E^5$ before mentioned. The other arm of the rocking lever $Q^{15}$ is operatively connected to the front end of an elongated bar $Q^{16}$ which extends rearwardly from said lever and is supported at its other extremity by an upright prop $Q^{17}$ arranged below the cam shaft $F$ and hingedly connected to the stationary bracket $E^8$. On its under side the bar $Q^{16}$ is formed with two spaced apart, clearance notches $q^{12}$ and $q^{13}$, the former being located longitudinally of said bar so as to normally register with a corresponding notch in a horizontal member of the exposure control mechanism not as yet described, and the notch $q^{13}$ being located so as to normally accommodate a small angular stop plate $q^{15}$ fastened upon a short extended portion $q^{16}$ of the rod $Q^{12}$. However by operating the push button $Q^{14}$ before the cam shaft has completed the first quarter of its revolution and while the clutch Q is still held disengaged by the cam shoe $f^4$, the bar $Q^{16}$ will be moved longitudinally forward to the position shown in Figs. 17 and 18 where said bar will positively prevent the engagement of the clutch as well as the exposure until the machine cycle is nearly completed. At such time the bar $Q^{16}$ and the push button $Q^{14}$ will be restored to their normal position automatically in a manner presently to be pointed out.

In order to provide for exceptionally wide spacing between lines, paragraphs or pages of print matter whenever the occasion should arise, devices operable by a relatively small hand wheel S located conveniently in the control plate $E^1$, are also included in the improved machine, and whereby the film feed and clutch control mechanism may be actuated in precisely the same way as that already described, by one complete turn of said wheel while the machine is at rest. These devices (Figs. 15, 16 and 17) comprise two spaced apart cam elements $S^1$ and $S^2$ secured to the rear end of a fore and aft shaft $S^3$, and arranged respectively in operative relation to a pair of vertically disposed levers $S^4$ and $S^5$ which carry anti-friction rollers $s^1$, $s^2$ directly opposed to said cam elements. The shaft $S^3$ (Fig. 17) is journaled in front and rear bearing brackets $S^6$ and $S^7$ and is operable by the hand wheel S which also is secured like the cam elements $S^1$ and $S^2$, to the front end of said shaft. At their lower ends the levers $S^4$ and $S^5$ are mounted on separate hinge pins $s^3$ in the bracket $S^7$, and at their upper ends they engage corresponding apertures $q^{17}$ and $r^{13}$ formed respectively in overlying extended portions of the rods $Q^{12}$ and $R^7$. The parts are so arranged (Figs. 14 and 16) that when the shaft $S^3$ is rotated, the larger of the two cam elements $S^1$ first will engage the roller $s^1$ of the lever $S^4$ and through the connection of the latter with the rod $R^7$, will cause the partial rotation of the rock shaft $R^1$, necessary to actuate the clutch Q and advance the film in the manner required. Then, as the shaft $S^3$ is further rotated, the smaller cam element $S^2$ will engage the roller $s^2$ of the lever $S^5$, and actuate the latter so as to impart through its connection with the horizontal rod $Q^{12}$, the necessary rotary movement to the rock shaft $Q^7$ to momentarily release the clutch Q just before the rotation of the shaft $S^3$ is completed.

It will be understood that in all commercial Linotype machines the distributing mechanism includes a horizontally reciprocable slide operable as a machine cycle is completed, to shift a matrix line supported at the distributing level, from the second elevator bar into the distributor box for final distribution. The line shifting slide (not shown) is attached to the upper end of a long vertically disposed and forwardly inclined arm $F^3$, the lower end portion of which and as shown best in Figs. 19 and 24, is appropriately connected to a sleeve member $F^4$ mounted to rock about a comparatively short shaft $F^5$, the latter being located directly over the rear end of the longer rock shaft $R^1$ and also supported in upright members of the stand bracket $E^7$. The sleeve member $F^4$ is rotatable in one direction to impart the active stroke to the line shifting slide, by a spring $F^6$, and is rotatable positively a predetermined distance in the opposite direction against the tension of said spring, by a vertical link $F^7$ connected at its upper end to an arm $f^6$ projecting laterally from the sleeve member. The spring $F^6$ also is connected to the arm $f^6$ of the sleeve member $F^4$ and as best shown in Fig. 23, is anchored to the base frame O, while the link $F^7$ at its lower end is connected to one arm of a bell crank lever $F^8$ pivotally mounted in the bracket $E^7$. The other arm of the bell crank lever $F^8$, is connected through the medium of a spring coupling $f^7$, to a horizontal, endwise movable cross rod $F^9$ which in turn is connected to a cam actuated lever $F^{10}$ arranged directly below the lever $R^8$ (before described), and like the lever $Q^{13}$, is mounted between its ends on the same vertical axis in the stationary bracket $E^8$. The lever $F^{10}$ (Fig. 17) is operatively connected to the contiguous end of the cross rod $F^9$, and is provided with an antifriction roller $f^8$ arranged to engage a single cam shoe $f^9$ secured to the outer face of the cam $F^1$. The lever $F^{10}$ also includes a shorter hook shaped member $F^{11}$ disposed in engaging relation to the upright hinged prop $Q^{17}$ which supports the rear end of the elongated bar $Q^{16}$ associated with the line cancelling devices already described. It should now be clear that as the machine approaches the end of its cycle and the cam shoe $f^9$ engages the roller $f^8$ of the lever $F^{10}$, the vertical link $F^7$ will be raised by the cross rod $F^9$ in opposition to the spring $F^6$, and thus rotate the sleeve member $F^4$ in the proper direction to move the line shifting slide idly into a position to start its active stroke. Coincident with this operation the hook shaped member $F^{11}$ of the lever $F^{10}$, is caused to engage and rock the hinged prop $Q^{17}$ rearwardly to restore the line cancelling devices to their normal positions as indicated in dotted lines Figs. 17 and 18. As the machine cycle is completed, and the cam shoe $f^9$ is carried out of engagement with the roller $f^8$, the spring $F^6$ is allowed to rotate the sleeve in the opposite direction so as to impart the active stroke to the line shifting slide for the purpose stated.

Reference again is directed to Figs. 1, 2, 5 and also to Fig. 32 which show the lens carrier $C^2$ and certain parts immediately associated therewith about to be described. As previously stated, the base member $C^4$ of the lens carrier like that of the camera head $C^1$, is adjustably mounted in the elongated guideways $n$ of the camera supporting frame N and the lens $C^{12}$ is capable of independent adjustment in order that the clamping edge of the relatively fixed right hand line clamping jaw may be projected in a constant vertical line on the film $l$ under all conditions of magnification. Accordingly, the lens $C^{12}$ (Figs. 5, 18 and 32) is secured to a rectangular slide T and the latter is mounted for horizontal adjustment in suitable guideways $t$ of a similarly shaped plate $T^1$ fastened to the upright supporting member $C^{13}$ o the lens carrier. The adjustments of the lens slide T according to the present invention, are effected automatically as the carrier $C^2$ is set in its different adjusted positions in the manner before described, and the means employed for this purpose (Figs. 5 and 32) include a fixed segmented plate cam $T^2$ directly opposed to an antifriction roller $t^1$ mounted at the outer end of a horizontal arm $t^3$ which projects outwardly from one edge of the lens slide T. The plate cam $T^2$ is secured to one side of a vertical column $O^2$ rising from the machine base O, and is provided with a series of twelve individually adjustable segments $t^4$ adapted collectively to present a mathematical curve to the roller $t^1$ of the lens slide T. A vertically disposed, spring actuated lever $T^3$ engaging a stud $t^5$ projecting forwardly from the lens supporting slide T, holds the roller $t^1$ yieldingly engaged with one or another of the segments $t^4$ under different camera settings. The lever $T^3$ is pivoted to the front face of the supporting member $C^{13}$ and formed with a short depending arm connected to a pull spring $t^6$ anchored to said frame. The camera shutter (not shown) is held as usual, normally closed under light spring tension, and is opened automatically at the proper moment during a machine cycle by the operation of a second vertically disposed lever $T^4$ pivotally attached to a projecting ear $c^{20}$ on the member $C^{13}$, and engaging directly the stem portion $t^7$ of the small gauge, flexible shafting through which the operation of the shutter is controlled.

Since the size of the opening in the camera shutter as well as illumination are constant, the time of exposure must be varied in order to obtain clear and sharply defined images of a composed matrix line in any one of the twelve camera settings allowed. Consequently and to carry out the invention, the shutter first is opened at a predetermined moment during a cycle and then closed after the proper exposure has been made for any selected magnification, these operations being effected automatically and without attention on the part of the operator, under any selected setting of the camera. The mechanism employed (Figs. 33 to 40) includes an irregularly shaped lever $T^5$ pivotally mounted on a horizontal axis $t^8$ in a frame bracket $E^9$, and arranged in close proximity to a large gear wheel $F^{12}$ which is secured to one end of the cam shaft $F$ and is driven in the usual way through a spring actuated clutch from the drive shaft $F^{13}$ (not shown).

The lever $T^5$ (Figs. 33 and 35) is formed with a relatively long, forwardly projecting arm $T^6$ and normally is held in the position shown in Fig. 35 against an overhead banking screw $t^9$ by a pull spring $T^7$, the latter being connected to another arm $T^8$ of said lever and anchored to an adjustable device $T^9$ for regulating the tension of said spring. The arm $T^6$ of the lever $T^5$, is operatively connected by a vertical link $t^{10}$ to the piston $t^{11}$ of an air dashpot $T^{10}$, and terminates in operative relation to a similarly disposed actuating element $T^{11}$ (Fig. 34) for devices presently to be described. Operation of the lever $T^5$ during a machine cycle is effected by a cam plate $T^{12}$ fastened to the outer face of the gear wheel $F^{12}$ and arranged to engage a roller $t^{12}$ mounted in an ear $t^{13}$ projecting upwardly from said lever near its pivotal axis $t^8$. The gear wheel $F^{12}$ also carries a trip dog $T^{13}$ spaced a definite number of degrees behind the cam plate $T^{12}$ and pivotally mounted for a limited movement on said wheel against the influence of a light wire spring $t^{14}$. The trip dog $T^{13}$ (Fig. 36) on one edge is formed with a nose portion $t^{15}$ and at its free end, is also formed with a lateral tooth-like projection $t^{16}$ which latter is adapted under certain conditions presently to be pointed out, to engage and actuate a bell crank lever $H^3$ associated with the main clutch lever $H$ and pivotally mounted on a member of the stationary bracket $E^9$.

Figure 33:
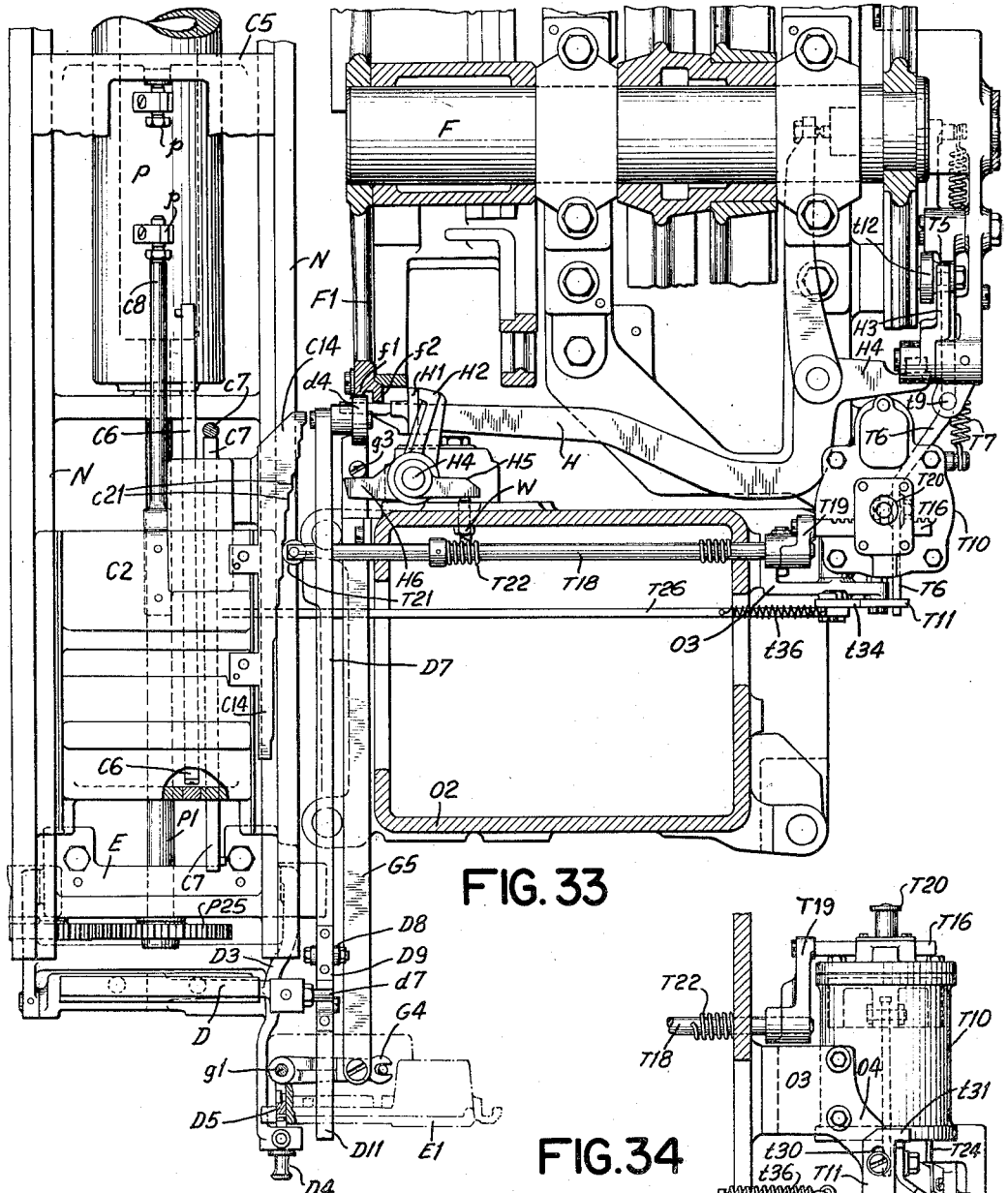
Fig. 33 is a top plan view partly in section, showing the exposure control mechanism, manual and automatic devices controlling the operation of the main clutch, the camera base and certain parts supported thereby.
Figure 34:
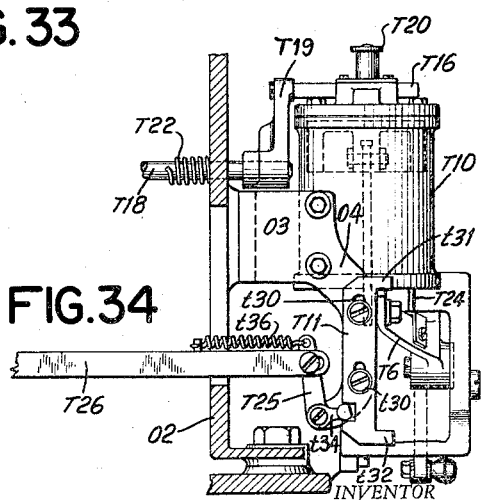
Fig. 34 is a front elevation partly in section of part of the exposure control mechanism shown in Fig. 33.

As best shown in Figs. 33 and 34, the dash pot $T^{10}$ is supported by a stationary bracket $O^3$ and is equipped with a rotatably adjustable disk $T^{14}$ arranged directly over the piston $t^{11}$ and held snugly against the lower surface of the head portion $T^{15}$ of the dash pot by a clamping nut $t^{17}$ which is mounted on the stem of a clutch member $t^{18}$ keyed to said disk and held normally engaged with a corresponding clutch member $t^{19}$. The disk $T^{14}$ near its outer edge is formed with two groups of twelve apertures or vents $t^{20}$ and $t^{21}$ (Fig. 40) varying slightly in size and so arranged that by a half rotation of the disk, the apertures in either group may be brought into use as desired and in a manner later to be described. The apertures of the group selected are adapted under different adjustments of the disk $T^{14}$, to register with an angular escape opening $t^{22}$ formed in the head portion of the dash pot and leading to the atmosphere. The adjustments of the disk $T^{14}$ are effected by a horizontally disposed, endwise movable rack bar $T^{16}$ arranged in mesh with a pinion $T^{17}$ (Fig. 39) and secured to one end of a similarly disposed cross rod $T^{18}$ through the medium of a suitable coupling $T^{19}$. The pinion $T^{17}$ is rotatably mounted upon a vertical spindle $t^{23}$ of the clutch member $t^{19}$, and is formed in its upper surface with diametrically opposed notches $t^{24}$ to accommodate corresponding lugs on the lower edge of a cap $T^{20}$ which is keyed to said spindle so that it may be raised slightly to break its engagement with the pinion $T^{17}$ when desired. The arrangement of the parts is such, that the rotation of the pinion $T^{17}$ by the rack bar $T^{16}$, will cause also a corresponding rotation of the cap $T^{20}$, and through the key connection of the latter with the spindle $t^{23}$, and the engagement of the two clutch members $t^{18}$ and $t^{19}$, will effect the adjustments of the disk $T^{14}$ to bring any one of the apertures or vents in a selected group into register with the escape opening $t^{22}$, as required. Operation of the rack bar $T^{16}$ to bring about the adjustments of the disk $T^{14}$ in the manner just stated, is effected automatically by a fore and aft stepped cam plate $C^{14}$, attached to the base member of the lens carrier $C^2$ and adapted to function as the latter is moved to its different focusing positions. The rack bar $T^{16}$ (Figs. 33 and 34) is mounted and properly guided in the head portion of the dash pot $T^{10}$, and the cross rod $T^{18}$ to which the rack bar is connected, extends through and beyond the opposite side walls of the upright column $O^2$. As best shown in Fig. 33, the cam plate $C^{14}$ (Fig. 33) is formed with a series of twelve steps $c^{21}$ properly spaced apart and arranged to engage a roller $T^{21}$ mounted at the free end of the cross rod $T^{18}$. A compression spring $T^{22}$ seated against one of the side walls of the column $O^2$ and engaging a collar pinned to the rod $T^{18}$, holds the roller $T^{21}$ yieldingly engaged with the steps $c^{21}$ as the cam plate $C^{14}$ is moved with the lens carrier during the focusing operations. However, when it is desired to interchange the two groups of apertures in the disk $T^{14}$, the cap $T^{20}$ first, is raised slightly to break its engagement with the pinion $T^{17}$, and then is turned 180 degrees relatively to the pinion $T^{17}$, so as to impart a like rotation to said disk through its connection with the clutch members $t^{18}$ and $t^{19}$, and finally is reseated in the notches $t^{24}$ of the pinion.

In order that the lever $T^5$ may quickly complete its return stroke without the retarding influence of the piston $t^{11}$, the dash pot $T^{10}$ is also equipped with a fluted relief valve $T^{23}$ arranged in a chamber $t^{25}$ which is formed in the head portion $T^{15}$ of the pot and communicates through a restricted opening $t^{26}$ with the compression space ahead of the piston $t^{11}$. The valve $T^{23}$ is movable a limited distance downwardly and upwardly to and from its closed positions (Fig. 38) and is controlled by the operation of the lever $T^5$ through the medium of a vertical push rod $T^{24}$ supported and guided in upper and lower projecting ears $t^{27}$ of the dash pot $T^{10}$. Normally the rod $T^{24}$ is sustained by a collar $t^{28}$ in the position shown in Fig. 38, with its upper end clearing the valve $T^{23}$ and its lower end disposed in engaging relation to a finger piece $t^{29}$ adjustably attached to the piston control arm $T^6$ of the lever $T^5$. However as the arm $T^6$ and piston $t^{11}$ approach the end of their upward stroke under the influence of the pull spring $T^7$, the rod $T^{24}$ will be pushed upwardly to open the valve $T^{23}$ and thus allow the compressed air ahead of the piston to more quickly escape.

At this moment the arm $T^6$ of the lever $T^5$ is adapted to engage and raise the actuating element $T^{11}$ before mentioned, said element as best shown in Fig. 34, being attached for a limited vertical movement in both directions by screw and slot connections $t^{30}$, to a depending projection $O^4$ of the stationary bracket $O^3$, and at its upper and lower ends is formed with a pair of lugs or ears $t^{31}$ and $t^{32}$ respectively, projecting outwardly from one edge of said element into the path of the lever arm $T^6$.

As the actuating element $T^{11}$ is raised, it is adapted to operate, through the medium of a small bell crank lever $T^{25}$, a horizontal rod or link member $T^{26}$ which is arranged beneath the camera supporting frame N as shown in Fig. 32, and is connected to the lower end of a relatively long depending arm $T^{27}$ of a rocking bail member $T^{28}$ about to be described. The bell crank lever $T^{25}$ is pivotally attached to the lower end of the bracket projection $O^4$ and provided with two arms $t^{33}$ and $t^{34}$ respectively, the former engaging a notch formed in the contiguous edge of the actuating element $T^{11}$, and the latter being attached by a pin and slot connection $t^{35}$ to the horizontal cross rod $T^{26}$. A pull spring $t^{36}$ arranged between the arm $t^{34}$ and a projection on the rod $T^{26}$ holds these parts yieldingly in the position shown in Fig. 34. As best shown in Figs. 1, 2 and 32, the bail member $T^{28}$ is mounted to rock to and fro about a pivot rod $t^{37}$ supported in a stationary bracket $N^6$, and at its upper end the bail member is provided with a longitudinally grooved bar $T^{29}$ which engages a short depending arm $t^{38}$ (Fig. 32) of the shutter control lever $T^4$ before described, and is sufficiently long to operate said lever in any adjusted position of the lens carrier $C^2$.

It will now be seen that as the cam plate $T^{12}$ during a machine cycle, engages the roller $t^{12}$ of the lever $T^5$, the latter will be forced downwardly against the tension of its spring sufficiently far to depress the actuating element $T^{11}$ through its engagement with the lower lug $t^{32}$ of said element. As a result the small bell crank lever $T^{25}$ will be turned clockwise (Fig. 34) and through the spring $t^{36}$ pull the horizontal rod $T^{26}$ endwise in the proper direction to cause the operation of the lever $T^4$ and the opening of the camera shutter for an exposure. The time of the exposure is determined by the adjusted position of the perforated disk $T^{14}$ which governs the speed at which both the piston $t^{11}$ of the dash pot $T^{10}$ and the lever $T^5$, is permitted to complete their return stroke; and since the usual magnifications and reductions ranging from six to twenty-four points, require only a few seconds, they are readily accomplished within the time required to complete the normal machine cycle of operation.

In such instances the lever $T^5$ will have had time to obtain its normal position of rest against the overhead banking screw $t^9$ with its upwardly projecting ear $t^{13}$ located in the path of the nose portion of the trip dog $T^{13}$ before mentioned, so that the latter in passing said ear will be rocked slightly in opposition to its spring as shown in Fig. 36, and thus permit the projection $t^{16}$ to clear the bell crank lever $H^3$ already described. However in instances where the magnifications desired range upwardly to say 60 or 72 pt., the return stroke of the dash pot lever $T^5$ will be abnormally delayed and as a result the projection $t^{16}$ of the trip dog $T^{13}$ in passing the lever $H^3$ (Fig. 37), will actuate it and through the engagement of the latter with a short horizontal arm $H^4$ (Fig. 33) of the clutch lever H, will automatically stop the operation of the machine. Then and due to a slippage of the main clutch the projection $t^{16}$ of the trip dog slowly will be caused to break its engagement with the bell crank lever $H^3$ and thus permit a reengagement of the clutch to automatically restart the machine cycle of operation.

It should now be seen, and to briefly recapitulate, that after the camera has been completely extended and the cylindrical control dial set to regulate the film feed mechanism and effect the adjustments of the mask plates and the camera stop drum, the camera is collapsed until the head and lens carrier thereof are stopped in their proper focusing position. The start of the machine cycle and the operations which follow during the cycle take place in their predetermined order of succession in the usual Linotype way until the cycle is completed. If for any of the well known reasons, the composed line should fail to be carried by the descent of the first elevator, to its proper position in front of the camera, or fail to be properly justified between the line clamping jaws, the operation of the machine will be automatically stopped by certain safety devices hereinbefore described. Also if preparatory to the justification operations the forward movement of the matrix aligning bar should be interrupted, a third safety device would function to stop the operation of the machine. After the cause of such difficulties is rectified the cycle of operation may readily be restarted by actuating an appropriately marked push button located conveniently at the front of the machine. A second push button associated with the restarting button is also provided whereby the operation of the machine may be stopped at any time during a cycle, as desired. Furthermore, a properly composed line, after it has been sent into the machine, may for any reason be cancelled without interrupting the cycle, by operating a third push button before the time of exposure or within the first ninety degrees of rotation of the main cam shaft. The offending line therefore may be carried through the machine and be distributed while all parts affected by the actuation of the third button, are automatically restored to their normal position. Line spacing between paragraphs, pages or any other types of print matter, may readily be acomplished as and to the extent desired while the machine is at rest by consecutive full turns of a small hand wheel connected to the film feed mechanism and also conveniently located at the front of the machine. The timing and period of exposure under the different camera settings are automatic and controlled from the main shaft through the dash pot mechanism last to be described.

Having thus described my invention what I claim is:

1. In a photocomposing machine of the class described, wherein a composed line of matrices bearing photographically reproducible characters is delivered and justified between a pair of line clamping jaws during each machine cycle of operation, the combination of an extensible camera arranged to photograph the justified matrix line, said camera including a head, a lens carrier and a film holder detachably secured to the camera head, a rotatably adjustable drum provided with two sets of stop elements whereby the camera may be set in different focusing positions, film feed mechanism capable of adjustment for different line spacing, adjustable means for limiting the area of the film to be exposed under the different camera settings, and a single rotatably adjustable control dial appropriately labeled and operable at will to simultaneously effect the adjustments of the focusing stop drum, film feed mechanism and the means for limiting the area of the film to be exposed.

2. A combination according to claim 1 including film feed adjusting devices, and wherein the control dial is operatively connected to the front end of a fore and aft shaft journaled in the camera supporting frame and operatively connected to said devices, and wherein the focusing drum is mounted at the rear end of a similarly disposed shaft also journaled in said frame; and including gear connections between said shafts whereby the turning of the dial to different adjusted positions for film feed settings, will automatically effect a corresponding adjustment of the focusing drum.

3. A combination according to claim 1, including a shaft leading to the adjustable devices, and wherein the control dial is keyed to said shaft and provided with a retractible handle whereby both the shaft and dial may be turned and locked against rotation in their different adjusted positions.

4. A combination according to claim 1, wherein the control dial is mounted to rotate in a fixed housing formed with an open slot and appropriately marked to indicate the point size of the five different matrix fonts that may be employed as well as the location of certain markings on the dial.

5. A combination according to claim 1, wherein the control dial is provided with a label enveloping the outer surface thereof and having markings indicating the different image magnifications and reductions obtainable from a selected matrix font as well as the corresponding ratios, said markings being displayed in rows so as to be read in conjunction with corresponding markings on the dial housing as the dial is adjusted.

6. In a photocomposing machine of the class described wherein the characters of a justified line of matrices are reproduced on a sensitized film during each machine cycle of operation, the combination of an extensible camera including a head and a lens carrier mounted respectively to slide in fixed guideways common to both and adjustable simultaneously to different focusing positions therein, a rotatably adjustable stop drum operable to effect such adjustments, means for adjusting the stop drum, film feed means carried by the camera head and capable of adjustment for different line spacing, means for adjusting said film feed means, a film holder, a pair of mask plates mounted therein and individually adjustable to limit the area of the film to be exposed under different camera settings, means for adjusting said mask plates, a single rotatably adjustable control dial common to all three said adjusting means, and motion transmitting connections between the control dial and the three said adjusting means whereby the rotary adjustment of the dial will simultaneously effect corresponding adjustments of the stop drum, the film feed means and the mask plates for different camera settings.

7. A combination according to claim 6, wherein the film feed and mask adjusting means include respectively a rotatably adjustable disk mounted on a vertical axis and provided with upright concentrically arranged banking studs of different heights, and intermediate connections whereby selected banking studs will determine the adjusted positions of both the film feed and mask plates.

8. A combination according to claim 7 including a fore and aft shaft journaled in the camera supporting frame and operable by the control dial, and gear connections between said shaft and the respective disks whereby the disks may be adjusted by the operation of said dial to bring the proper banking studs into active position for any selected camera setting.

9. A combination according to claim 7 wherein the two disks are mounted in a slide carried by the base frame of the camera head and capable of independent adjustment as desired to change the settings of the film feed and mask plates to correspond to the point size of the particular matrix font in use.

10. In a photocomposing machine of the class described equipped with a periodically operated main cam shaft which partakes of one complete rotation from and to a position of rest for each machine cycle and wherein the characters of a justified line of matrices are reproduced on a sensitized film during each machine cycle, the combination of an extensible camera arranged to photograph the justified matrix line, said camera including a head and a lens carrier mounted respectively in fixed guideways common to both and adjustable simultaneously to different focusing positions therein, a film holder attached to the camera head and wherein a film supply spool and a rewinding spool are rotatably mounted, film feed mechanism carried by the holder and including a rotatable disk clutch normally engaged and connected through suitable gearing to the rewinding spool, means controlled from the main cam shaft and actuated after the inauguration of the machine cycle to give a partial turn to the clutch and advance the film for proper line spacing, means also controlled from the main cam shaft for disengaging the clutch momentarily immediately after the advance of the film to allow the clutch to return to its initial position without disturbing the advanced film, and spring-actuated means for effecting such return of the disengaged clutch and permitting it to be reengaged before the start of the next succeeding machine cycle.

11. A combination according to claim 10, wherein the clutch assembly includes a spindle, a sleeve rotatably mounted thereon, a driving gear keyed to the sleeve, a disk spaced from the gear and capable of a limited axial movement on the sleeve in opposition to a compression spring to release the clutch, and an intermediate member rotatably mounted on the sleeve and operable when the clutch is engaged to rotate said gear step by step and impart the partial turns to the rewinding roll.

12. A combination according to claim 10, including a rotatable hand crank located at the front of the machine and operable independently of the main cam shaft, and means actuated by one complete rotation of said hand crank while the cam shaft is at rest for operating the film advancing clutch to feed the film one line space at a time.

13. A combination according to claim 10, including means for adjusting the clutch actuating means to increase the partial turn of said clutch during the rotation of the main cam shaft and thus increase the normal spacing between lines.

14. A combination according to claim 10, wherein the film feed mechanism includes a long rock shaft and a relatively short rock shaft both controlled from the main cam shaft, said rock shafts being operated at different periods in the rotation of said cam shaft, and separate connections between the rotatable disk clutch and said rock shafts, one connection first actuating the clutch to advance the film the required distance, and the other connection next momentarily disengaging the clutch after such advance of the film.

15. A combination according to claim 10, wherein the connections between the rotatable disk clutch and its actuating means are operative in all focusing positions of the camera head notwithstanding the mounting of the film feed mechanism upon the camera head.

16. A combination according to claim 14, wherein the clutch is held normally engaged under spring tension and wherein the connection between the longer rock shaft and the clutch, includes a spring controlled arm for rotating the clutch, a rod depending from said arm and an elongated bar supported from said rock shaft for raising the rod in any adjusted position of the camera head, so as to effect the rotation of the clutch and an advance of the film at a definite point in the machine cycle.

17. A combination according to claim 14, wherein the connection between the shorter rock shaft and the clutch includes an elongated pusher plate supported from said rock shaft, and means controlled by the operation of said plate for effecting the disengagement of the clutch immediately after the advance of the film.

18. In a photocomposing machine of the class described wherein the characters of a justified line of matrices are reproduced on a sensitized film during each machine cycle of operation, and equipped with an extensible camera including a head and a lens carrier adjustable simultaneously to different focusing positions therein, the combination of cam actuated devices for opening the camera shutter in any adjusted position of the lens carrier, an air dash pot, means mounted therein and capable of adjustment to vary the closing time of the shutter, and means mounted on the lens carrier and cooperating with the adjustable timing means for effecting the adjustment of said means automatically according to the focusing position of the camera.

19. A combination according to claim 18, wherein said timing means include a disk formed with a series of concentrically arranged air vents, and mounted in the head of the dash pot for rotary adjustment to bring any selected vent into use, a stepped plate cam attached to the lens carrier and intermediate connections whereby the cam plate will effect the adjustments of said disk to change the time of exposure for any particular camera setting.

20. A combination according to claim 18 including a cam controlled member operable automatically under certain adjustments of said shutter timing means to stop the operation of the machine momentarily and then restart it automatically during a cycle.

21. In a photocomposing machine of the class described equipped with a periodically operated main cam shaft which partakes of one complete rotation from and to a position of rest for each machine cycle and wherein the characters of a justified line of matrices are reproduced on a sensitized film during each machine cycle of operation, the combination of an extensible camera including a head and a lens carrier adjustable simultaneously to different focusing positions therein, automatic means controlled from the main cam shaft and operable during a machine cycle for opening and then closing the camera shutter in any adjusted position of the lens carrier, automatic film feed mechanism also controlled from the main cam shaft and operable after an exposure to advance the film for line spacing, and means operable at will for disabling both the automatic shutter control means and the automatic film feed mechanism without interrupting the machine cycle.

22. A combination according to claim 21, wherein the said disabling means includes a reciprocable locking rod movable at will before an exposure to active position, and means located conveniently at the front of the machine for effecting such movements of the rod; and including means controlled from the main cam shaft for restoring said rod to normal or inactive position automatically as the machine cycle is completed.

23. In a photocomposing machine of the class described, wherein a composed line of matrices bearing photographically reproducible characters, is delivered and justified between a pair of line clamping jaws during each machine cycle of operation, and wherein one of said jaws is relatively fixed and determines the theoretical end of the line while the other jaw is capable of adjustment to accord with composed lines of different lengths, the combination of an extensible camera arranged to photograph the justified matrix lines and including a head and a lens carrier capable of individual adjustment toward and from each other for different camera settings, a film holder attached to the camera head, a lens supporting member mounted for lateral adjustment on said carrier to shift the lens lengthwise of and parallel to the composed line and thus locate the lens in the proper position to project the clamping edge of the fixed jaw in a constant vertical line on the film under all conditions of magnification and reduction, and means controlled by the camera settings for effecting the corresponding adjustments of said lens supporting member.

24. A combination according to claim 23, wherein said adjusting means comprises a stationary segmented plate cam, and the lens supporting member is provided with an anti-friction roller arranged to ride over the segmented edge of said cam during the adjustments of the lens carrier; and including spring actuated means connected to said member for holding it in its different adjusted positions.

25. In a photocomposing machine of the class described equipped with a periodically operated main cam shaft which partakes of one complete rotation from and to a position of rest for each machine cycle and wherein a composed line of matrices bearing one or two photographically reproducible characters is delivered between a pair of line clamping jaws where it is properly justified, the combination of a vertically movable transporter to receive the composed line and constructed to support the matrices at an upper or at a lower level, means controlled from the main cam shaft for first moving the line transporter downwardly into photographic position between the jaws and later upwardly from between the jaws for distribution of the line, said means being operable when the transporter is in photographic position for lifting the elevator a short distance to align the matrices therein, aligning means movable into engaging relation to the composed line before such lifting of the transporter, said aligning means comprising upper and lower ribs which sustain the matrices by their lower projecting ears as the matrices are lifted by the transporter, whereby the matrices standing at either level or at both levels are vertically aligned, means also controlled from the main cam shaft for effecting such movement of the aligning means, a camera for photographing the justified line after the matrices have been aligned in the transporter by the lifting action of the latter, a shutter for the camera, and means likewise controlled from the main cam shaft for opening the shutter at the proper time in the machine cycle.

26. A combination according to claim 25, including safety means controlled by the matrix aligning means to stop the operation of the machine and hence the camera in the event of an interruption in the movement of the aligning bar to its active position.

27. A combination according to claim 26, wherein the aligning means comprises a horizontally disposed bar presenting two closely spaced apart aligning ribs, and capable of vertical bodily adjustment to bring one or both ribs into use according to the level or levels at which the matrices are supported in the line transporter; and including conveniently located means operable to effect the adjustments of said bar as desired, and means whereby the bar may be locked in either of its adjusted positions.

28. A combination according to claim 27, including a hinged vertically disposed supporting member for the aligning bar, and wherein the cam controlled means includes a fore and aft reciprocable rod connected at its rear end to one arm of a cam actuated rocking lever, and at its front end to the bar supporting member.

29. In a photocomposing machine of the class described, wherein a composed line of matrices bearing photographically reproducible characters is delivered and justified between a pair of line clamping jaws during each machine cycle of operation, the combination of an extensible camera arranged to photograph the justified lines, said camera including a head, a lens carrier and a film holder carried by the head, means for setting the camera in different focusing positions, film feed mechanism, means for adjusting said feed mechanism to vary the line spacing in accordance with the focusing position of the camera, film mask plate operating means, means for adjusting said mask plate operating means to vary the area of the film to be exposed in accordance with the focusing position of the camera, a single control dial, and motion transmitting connections between the control dial and the camera setting means, the film feed adjusting means and the film mask plate adjusting means whereby the setting of the control dial will simultaneously effect corresponding adjustments of the three said elements for different camera settings.

30. A combination according to claim 29, wherein the camera setting means comprises an adjustable member carrying two sets of stop elements to control the adjustments of the camera head and lens carrier respectively, said elements being arranged on said member in separate pairs and being differently spaced apart in the respective pairs, there being as many different pairs of stop elements as there are different adjusted positions of the adjustable member, and the adjustable member having as many different adjusted positions as there are camera settings.

31. A combination according to claim 29, including camera shutter operating means, means for adjusting said operating means in accordance with the focusing position of the camera, and additional motion transmitting connections between said adjusting means and the single control dial whereby the setting of said dial will simultaneously effect corresponding adjustments of the camera setting means, the film feed adjusting means, the film mask plate adjusting means, and the shutter adjusting means.

32. A combination according to claim 29, wherein the film feed mechanism is mounted partly in the fixed machine frame and partly in the movable film holder, said mechanism including connections between the separately mounted parts which permit the free movement of the film holder and which remain operative in all focusing positions of the camera.

33. A combination according to claim 29, wherein the film mask plate operating means is mounted partly in the fixed machine frame and partly in the movable film holder, said mechanism including connections between the separately mounted parts which permit the free movement of the film holder and which remain operative in all focusing positions of the camera.

34. A combination according to claim 29, including manually operable means for disabling the film feed mechanism and the mask plate operating means during a machine cycle, a periodically operated main cam shaft which partakes of one complete rotation from and to a position of rest for each machine cycle, and driving means for said shaft which complete the rotation thereof notwithstanding the disabling of the film feed mechanism and the mask plate operating means.

35. A combination according to claim 30, wherein the film feed adjusting means comprise an adjustable member carrying a set of banking studs of different heights corresponding in number to the pairs of stop elements carried by the adjustable member which controls the camera settings.

36. A combination according to claim 30, wherein the film mask plate adjusting means comprise an adjustable member carrying two sets of banking studs of different heights, said studs being arranged on said member in separate pairs, one pair carried by the adjustable member which controls each pair of stop elements for the camera settings.

37. A combination according to claim 36, wherein the stop elements for the camera settings are carried by a rotatably adjustable drum, and wherein the banking studs for the film feed adjusting means are carried by a rotatably adjustable disk, and wherein the banking studs for the film mask plate adjusting means are carried by a rotatably adjustable disk, said drum and disks being geared together for adjustment in unison and to corresponding extents.

38. A combination according to claim 30, including camera shutter operating means, means for adjusting said operating means in accordance with the focusing position of the camera, and operative connections between said adjusting means and the single control dial to effect corresponding adjustments of said adjusting means and the camera setting means, said shutter adjusting means comprising a rotatable control disk adjustable to as many different positions as there are pairs of stop elements carried by the adjustable member which controls the camera settings.

39. In a photocomposing machine of the class described equipped with a periodically operated main cam shaft which partakes of one complete rotation from and to a position of rest for each machine cycle and wherein a composed line of matrices bearing one or two photographically reproducible characters is delivered between a pair of line clamping jaws where it is properly justified, the combination of a vertically movable transporter to receive the composed line, means controlled from the main cam shaft for first moving the line transporter downwardly into photographic position between the jaws and later upwardly from between the jaws for distribution of the line, a vise frame wherein the line transporter is mounted and having a stop to locate the transporter in its lowermost position, an automatically operated camera also controlled from the main cam shaft for photographing the justified line while it remains in photographic position, a driving clutch for the main cam shaft, and safety means controlled by the line transporter to disengage the driving clutch if the transporter fails to complete its downward movement, said safety means thus acting to stop the operation of the machine and hence the camera under such conditions.

40. In a photocomposing machine of the class described equipped with a periodically operated main cam shaft which partakes of one complete rotation from and to a position of rest for each machine cycle and wherein a composed line of matrices bearing one or two photographically reproducible characters is delivered between a pair of line clamping jaws where it is properly justified, the combination of a vertically movable transporter to receive the composed line, means controlled from the main cam shaft for first moving the line transporter downwardly into photographic position between the jaws and later upwardly from between the jaws for distribution of the line, a vise frame wherein the line transporter is mounted and having a stop to locate the transporter in its lowermost position, yieldable mechanism mounted in said vise frame and controlled from the main cam shaft of the machine, said mechanism including a vertically reciprocable bar movable within prescribed limitations for driving the spacebands upwardly through a composed line to effect its justification, an automatically operated camera likewise controlled from the main cam shaft for photographing the composed line after justification, a driving clutch for the main cam shaft, and safety means controlled by the spaceband driving bar to disengage the clutch if the bar is allowed to complete its upward movement due to a short line, said safety means thus acting to stop the operation of the machine and hence the camera under such conditions.

References Cited in the file of this patent

UNITED STATES PATENTS

| Number | Name | Date |
|---|---|---|
| 1,266,111 | Evans | May 14, 1918 |
| 1,283,394 | Bawtree | Oct. 29, 1918 |
| 1,594,369 | Jones | Aug. 3, 1926 |
| 1,647,408 | Hunter | Nov. 1, 1927 |
| 2,107,273 | Amdur | Feb. 8, 1938 |
| 2,158,039 | Wenczler | May 9, 1939 |
| 2,166,419 | Wenczler | July 18, 1939 |
| 2,349,260 | Garroway | May 23, 1944 |
| 2,415,424 | Gaebel | Feb. 11, 1947 |
| 2,496,329 | Briechle | Feb. 7, 1950 |
| 2,552,881 | Freund | May 15, 1951 |